United States Patent
Aithal et al.

(10) Patent No.: US 10,719,369 B1
(45) Date of Patent: Jul. 21, 2020

(54) NETWORK INTERFACES FOR CONTAINERS RUNNING ON A VIRTUAL MACHINE INSTANCE IN A DISTRIBUTED COMPUTING ENVIRONMENT

(71) Applicant: Amazon Technologies, Inc., Seattle, WA (US)

(72) Inventors: Anirudh Balachandra Aithal, Seattle, WA (US); Ryan John Marchand, Seattle, WA (US); Kiran Kumar Meduri, Bothell, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 220 days.

(21) Appl. No.: 15/611,708

(22) Filed: Jun. 1, 2017

(51) Int. Cl.
  *G06F 9/50* (2006.01)
  *G06F 9/455* (2018.01)
  *H04L 12/46* (2006.01)
  *H04L 12/24* (2006.01)

(52) U.S. Cl.
  CPC ........ *G06F 9/5077* (2013.01); *G06F 9/45558* (2013.01); *G06F 2009/4557* (2013.01); *H04L 12/4641* (2013.01); *H04L 41/0893* (2013.01)

(58) Field of Classification Search
  CPC ............... G06F 9/5077; G06F 9/45558; G06F 2009/4557; H04L 41/0893; H04L 12/4641
  See application file for complete search history.

(56) References Cited

U.S. PATENT DOCUMENTS

| | | | |
|---|---|---|---|
| 8,484,353 B1* | 7/2013 | Johnson | G06F 9/5077 709/226 |
| 9,882,968 B1* | 1/2018 | Holgers | H04L 67/10 |
| 2009/0285190 A1* | 11/2009 | Baron | H04L 12/2867 370/338 |
| 2015/0082378 A1* | 3/2015 | Collison | H04L 63/20 726/1 |
| 2015/0237013 A1* | 8/2015 | Bansal | H04L 63/0263 726/13 |
| 2016/0378518 A1* | 12/2016 | Antony | G06F 9/45533 718/1 |
| 2016/0381058 A1* | 12/2016 | Antony | H04L 63/1425 726/23 |
| 2017/0257432 A1* | 9/2017 | Fu | G06F 9/5072 |
| 2017/0324645 A1* | 11/2017 | Johnsen | H04L 47/20 |
| 2018/0062908 A1* | 3/2018 | Rachamadugu | G06F 9/4856 |
| 2018/0123954 A1* | 5/2018 | Jiang | H04L 49/70 |

* cited by examiner

*Primary Examiner* — Meng Ai T An
*Assistant Examiner* — Michael W Ayers
(74) *Attorney, Agent, or Firm* — Quarles & Brady LLP

(57) ABSTRACT

Systems for provisioning virtual network interfaces (VNIs) for tasks running on a virtual machine instance in a distributed computing environment are provided. The systems receive a request to launch a task corresponding to a plurality of containers in an instance in association with an instruction to provide a VNI for the task with a set of network security rules. The system may select an instance with sufficient resources to launch the task and enable communication using the VNI. The system may inhibit processes running on the instance other than containers associated with the task from communicating via the VNI.

18 Claims, 8 Drawing Sheets

NETWORK INTERFACES FOR CONTAINERS RUNNING ON A VIRTUAL MACHINE INSTANCE IN A DISTRIBUTED COMPUTING ENVIRONMENT

BACKGROUND

Generally described, computing devices utilize a communication network, or a series of communication networks, to exchange data. Companies and organizations operate computer networks that interconnect a number of computing devices to support operations or provide services to third parties. The computing systems may be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf of, or for the benefit of, the general public.

To facilitate increased utilization of data center resources, virtualization technologies may allow a single physical computing device to host one or more instances of virtual machines that appear and operate as independent computing devices to users of a data center. The single physical computing device may create, maintain, delete, or otherwise manage virtual machines in a dynamic manner. In some scenarios, various computing devices may be associated with different combinations of operating systems or operating system configurations, virtualized hardware resources and software applications to enable a computing device to provide different desired functionalities, or to provide similar functionalities more efficiently. Further, virtual machines may themselves be partitioned into multiple isolated virtual systems, sometimes referred to as "containers." The virtual machine controls allocation of resources such as processing power and memory, and each container has its own process and network space in which the container may, for example, execute software programs.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1:
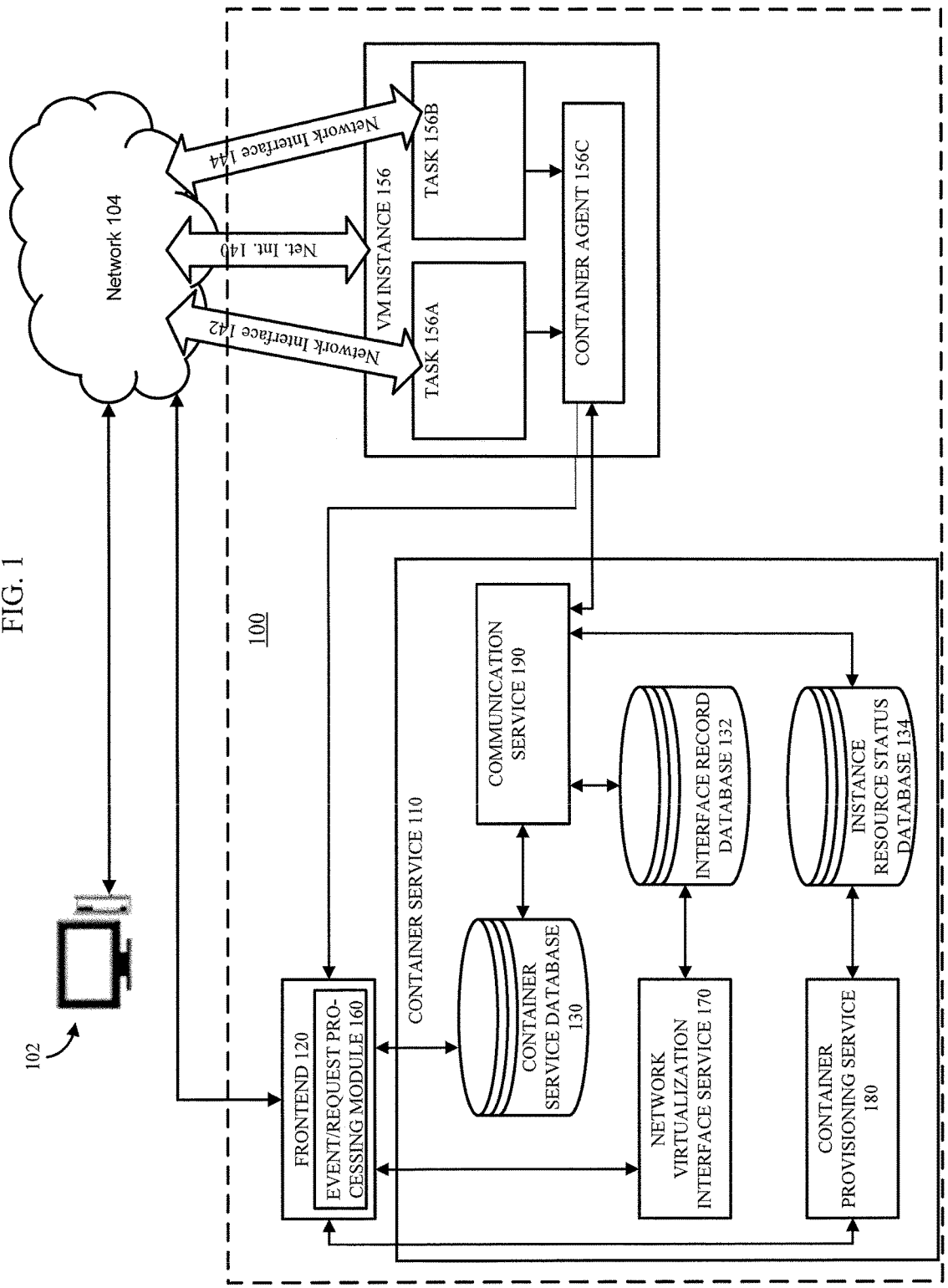
FIG. 1 is a diagram illustrating an exemplary system for providing virtual network interfaces (VNIs) for tasks running on a virtual machine instance in a distributed computing environment, in accordance with the present disclosure.

Developers and/or other users that use computing environments to perform computing operations (e.g., execute tasks for providing applications, services, database access, etc.) are often faced with tradeoffs between simplicity/efficient use of compute resources and security considerations. For example, a service provider that employs virtualization technologies To facilitate increased utilization of data center resources may operate networks of systems to provide access to software using varying numbers of virtual machine resources, and a user may run multiple different tasks from the same virtual machine instance. However, all of the tasks on the virtual machine instance may have to share a common network interface, which may have network security rules that are not ideal for each of the different tasks. In such a situation, the user may have to execute different tasks on different instances to ensure that appropriate network security rules may be applied to a particular task. This may create a more complex system that is more difficult to administer and may result in higher costs (e.g., if the service provider meters compute resources).

The service provider's system may operate a platform of virtualized compute resources including virtual machine instances that launch from a virtual machine image, and container instances that launch, from a container image, within an executing virtual machine instance. The system may maintain one or more container images from which a user may launch collections of container instances for executing tasks, as described in the present disclosure. More particularly, a container service system may allow a user to submit a request to execute a task based on a task definition, and may make allocation decisions regarding which container instance(s) to use to execute the task based on resources that are available when the request is received. Upon selecting (or launching) a particular container instance (or group of instances) to execute the task, the container service system may send a command to a container management program (e.g., Docker, containerd, kubernetes, etc.), running on the virtual machine instance, which causes the container management program to access one or more software container images and to launch container instances from them. The container management program may use the resulting container instances to begin executing the software represented by the software container image(s). The software may be the appropriate software for executing the task, and further may begin executing from an initial state represented by the software container images.

While it may be a more convenient and/or more efficient use of compute resources to provision container instances for executing multiple different tasks on the same virtual machine instance, the tasks may need to access a virtual network interface (VNI) (e.g., a virtual network adaptor or interface) attached to the virtual machine instance to send and/or receive network traffic. In some situations, such a VNI may be associated with a set of network security rules (e.g., firewall rules, IP table rules, etc.) to limit how the software running in the container instance may communicate over the network. However, the security rules, while appropriate for instances created from one task definition, may not be appropriate for instances created from another task definition. In a more particular example, the user may be executing a first task whose container instances require a first port to be open for receiving incoming traffic, and may wish to execute a second task whose container instances are to process traffic only from a second port. If container instances from these two tasks are required to share a common network interface (e.g., by virtue of being launched in the same virtual machine instance), these competing requirements cannot be accommodated by the network security rules of the common network interface.

In some embodiments, the request to launch the task may be associated with a request to provide a dedicated VNI for the task that may have different network security rules than a network interface of the container instance in which the task will eventually be launched and/or network interfaces associated with other tasks that may be running or may eventually run on the same container instance. In some embodiments, in addition to determining which instances have available compute resources to launch the requested task, the system may also determine whether an instance has the capacity to be associated with an additional VNI. For example, each container instance may be limited such that it cannot be associated with more than a particular number of VNIs, and the system may determine whether the container instance is currently using all of the permitted number of VNIs.

In some embodiments, the system may select one or more container instances from among available container instances with resources to execute the task with the requested VNI. The system may create an instance of the VNI and enable the selected container instance(s) to communicate with other compute resources, computing devices, etc., using the VNI instance. The VNI instance may be associated with a set of security rules. To associate the VNI instance with the security rules and other configurable parameters, in some embodiments the VNI instance may be created based on a VNI record that includes the set of security rules and other parameters that define the allowed operations associated with the VNI instance in accordance with the present disclosure. A user, such as an administrator of the computing environment in which tasks are being executed, may create the VNI record, such as by selecting or defining the security rules to be included in the set and causing the system to store the set of security rules in the VNI record. The VNI record may include a record identifier, and the user may reference the record identifier VNI in the task definition, so that when the container service processes the task definition it creates an instance of such VNI based on information in the VNI record. In another embodiment, the user may specify the desired set of security rules in the task definition. For example, the system may process the task definition and determine the security rules to use based on information stored in the task definition, and may associate such rules with a VNI record or instance of such VNI (if one was identified in the task definition or one was already created that has such rules) or create a new VNI record and configure the newly created VNI record to use the security rules. Generally then, the VNI instances launched from a VNI record associated with a task may enable container instances (executing in a virtual machine instance) allocated to the task to communicate over a network; such a VNI instance may be dedicated to the container instance(s) executing the task, so that the container instance(s) can communicate in a more secure manner than may be otherwise available using network interfaces common to all container instances of the virtual machine instance.

Referring to FIG. 1, embodiments of the present disclosure may operate within or upon a computing environment 100, such as a compute resource virtualization platform in which users (e.g., developers, website visitors, etc.) of user computing devices 102 may run various program codes using the virtual computing resources provided by a container service system 110 allocated within the computing environment 100. In some embodiments, user computing devices 102 may be a computing device associated with a user account of the container service, which may be used by an individual, a system, a resource computing device, and/or any other entity authorized to act on behalf of the individual or entity associated with the user account. For example, the user associated with user computing device 102 may utilize the container service system 110 to provide an application and/or service to other users through a virtual machine instance 156. In a more particular example, container service system 110 may be used to provide access to an online marketplace for other users, and these other users may then buy and/or sell goods and services through the online marketplace provided by the user associated with the user computing device 102 through the container service system 110.

The computing environment 100 may be one of any suitable type and/or configuration of a compute resource virtualization platform implemented on one or more physical computing devices. Non-limiting examples of a computing environment 100 include data centers, clusters of data centers organized into zones or regions, a public or private cloud environment, and the like.

In general, the user computing devices 102 may be any computing device such as a desktop, laptop, mobile phone (or smartphone), tablet, kiosk, wireless device, and other electronic devices. In addition, the user computing devices 102 may include web services running on the same or different data centers, where, for example, different web services may programmatically communicate with each other to perform one or more techniques described herein. Further, the user computing devices 102 may include Internet of Things ("IoT") devices such as Internet appliances and connected devices. The container service system 110 may provide the user computing devices 102 with one or more user interfaces, command-line interfaces ("CLI"), APIs, and/or other programmatic interfaces for generating and uploading software container images, task definitions, scheduling event-based jobs or timed jobs, tracking information submitted by the user computing devices 102, and/or viewing other logging or monitoring information related to requests and/or information submitted by a user through the user computing devices 102. Although one or more embodiments may be described herein as using a user interface, it should be appreciated that such embodiments may, additionally or alternatively, use any CLIs, APIs, or other programmatic interfaces. In some embodiments, one or more users (e.g., a developer, an owner, an administrator, etc.) associated with the tasks being executed by the container service system 110 may use user computing device 102 to interact with the container service system 110 to execute various operations. For example, a user of user computing device 102 may use user computing device 102 to generate container images, generate task definitions, provide container images and task definitions to the container service system 110 and/or any other suitable system (e.g., a storage system that may be accessed by the container service system 110), and/or run, stop, terminate, etc. containers and/or container instances. As another example, a user of computing device 102 (e.g., an end user) may use user computing device 102 to access an application and/or service being provided at least in part by a task being executed by the container service system 110.

As depicted in FIG. 1, the container service system 110 is operating in a distributed computing environment including several computer systems that are interconnected using one or more computer networks. However, the container service system 110 could also operate within a computing environment having any suitable number of devices. Thus, the depiction of the container service system 110 in FIG. 1 should be taken as illustrative and not limiting to the present disclosure. For example, the container service system 110 or various constituents thereof could implement various Web services components, hosted or "cloud" computing environments, and/or peer-to-peer network configurations to implement at least a portion of the processes described herein.

Further, the container service system 110 may be implemented in hardware and/or software and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

In some embodiments, a user computing device 102 may access the container service system 110 over a network 104. The network 104 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. For example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications ("GSM") network, a Code Division Multiple Access ("CDMA") network, a Long Term Evolution ("LTE") network, or any other type of wireless network. The network 104 may use protocols and components for communicating via the Internet or any of the other aforementioned types of networks. For example, the protocols used by the network 104 may include Hypertext Transfer Protocol ("HTTP"), HTTPS, Message Queue Telemetry Transport ("MQTT"), Constrained Application Protocol ("CoAP"), and the like. Protocols and components for communicating via the Internet or any of the other aforementioned types of communication networks are well known to those skilled in the art and, thus, are not described in more detail herein.

In some embodiments, the container service system 110 may cause container instances to execute a group of software containers that collectively perform a task. In some embodiments, the container service system 110 may store task definitions in a container service database 130, which may be accessed to, for example, launch a task in response to a request from user computing device 102. In some embodiments, a task definition (or task definition file) may refer to a file specifying a set of linked containers that are assigned to start as a group. For example, linked containers may be a set of containers that, when running on a host computing system (e.g., the VM instance 156), are associated with each other. In some embodiments, a task definition file may further specify compute resources to use for each container in the task definition, such as disk, memory, CPU, network access, and/or that the containers are able to share on a single physical machine. In some embodiments, a task definition file may be utilized for launching the set of containers for performing a task. In some embodiments, a task definition file may define and link containers spread across multiple physical machines. Additionally, in some embodiments, one task definition file may contain and/or be used to run multiple tasks. In some examples, a task may refer to an instantiation of a task definition file, and may include one or more containers. Tasks may be modified, in some embodiments, by applying a new task definition to the task.

In a particular example, a task definition may specify that a first task, entitled "db," has a software image located at the path "forest/postgresql." This first task may be allocated processing shares of 1,000 and 1 gigabyte of memory, and the first task may use port 5432. Additionally, the task definition may also specify a second task, entitled "web," which has a software image located at the path "hub.web-.com/rails:latest." The second task may be allocated processing shares of 1,000 and 1 gigabyte of memory, and the second task may use ports 8000:8000. The task definition notes that the second task ("web") is allowed to send network traffic to the first task ("db"). Note that while some units used in this example are given as a fixed number, such as the processing capacity given as a fixed number of central processing unit shares, it is contemplated that other units and other types of values (e.g., percentages of total processing capacity, percentages of total memory) could be used instead to allow for dynamic resource allocation.

In some embodiments, a "container instance" (sometimes referred to as a "virtual machine instance," a "virtual machine instance," or an "instance") may refer to a virtual machine instance (virtual or non-virtual, such as a physical computer system running an operating system) that is configured to launch and run software containers. In some embodiments, the container instance, shown in FIG. 1 as the virtual machine instance 156, may be configured to run the containers in accordance with the task definition file provided by the user, and stored in the container service database 130. In some embodiments, one or more container instances may be associated with a cluster, which may refer to set of one or more container instances that have associated with the cluster. In some embodiments, the VM instance 156 may be one of multiple different container instances associated with a particular cluster, and other container instances of the cluster may be configured to run the same or different types of containers as the containers being run by the VM instance 156. The container instances within the cluster may be of different instance types or of the same instance type, and the user may be associated with more than one cluster. Accordingly, in some embodiments, the user may launch one or more container instances and/or clusters of container instances, and manage user and application isolation of the containers within each cluster through application programming interface ("API") calls (e.g., which may be received by a frontend 120 as described below).

In some embodiments, a container (also sometimes referred to as a software container or an isolated user space instance) may be a lightweight virtualization instance running under a virtual machine instance that includes programs, data, system libraries, and/or any other suitable information that may be useful. In some embodiments, when the container is run, the running program is isolated from other processes running in the same virtual machine instance by a container management program. Additionally, in some embodiments, the containers may each run on an operating system (e.g., using memory, CPU, and storage allocated by the operating system) of the VM instance 156 and execute in isolation from each other (e.g., each container may have in isolated view of the file system of the operating system or of a file system from the container image, which is mounted by the container management program). Each of the containers may have its own namespace, and applications running within the containers may be isolated by only having access to resources available within the container namespace. Thus, containers may be an effective way to run one or more single applications within their own namespace. A container encapsulation system may allow one or more containers to run within a single operating instance without overhead associated with starting and maintaining virtual machines for running separate user space programs. In some embodiments, each container may be launched from a software image, which may, for example, represent the entire state of a software application at the time it was imaged as well as any dependencies stored in a file system, such that the software application may be restored to this point by restoring/launching the software image and mounting the file system. Additionally or alternatively, the container may be launched by installing an application from an executable file. In some embodiments, the container images may be accessed from any suitable location, such as container service database 130.

In some embodiments, containers may be launched as part of a task to use only specified resources from resources allocated to the container instance (e.g., the VM instance 156). For example, a container may be launched to have a certain amount of memory and to not utilize more than a specified amount of processing power. The resource allocation for the containers may be specified in the task definition that is used to launch the task that includes the container. In some embodiments, multiple containers may run simultaneously on a single host computer or host container instance, and the resources of the host may be allocated between the containers. In some embodiments, a particular host may support running containers in container instances from only one user. In other embodiments, a single host may allow multiple users to have container instances running on the host. In some such embodiments, the container service system 110 may implement security measures to reduce the likelihood that users are able to access containers, clusters, or container instances of others.

In some embodiments, different types of tasks (e.g., a first task 156A and a second task 156B) may have different resource requirements and may have different lifespans. Accordingly, in some embodiments, containers may be dynamically scheduled to run by a scheduler service in the container service system 110 independent of an underlying operating system of the container instance, and as such, the underlying operating system of the container instance may be very basic. Additionally or alternatively, the containers associated with a task may be scheduled to run by a scheduler installed within the container instance executing the containers.

In some embodiments, each of the container instances (e.g., VM instance 156) may be configured to contain a one or more agents that may be used to manage operations of the instance. For example, in some embodiments, each container instance may include a container management program, which in some embodiments can be or include container agent (e.g., container agent 156C shown in FIG. 1) to manage containers, provide state information, and enable logging and telemetry data collection. The container service system 110 may be include one or more other services, such a template service, one or more schedulers, a router service, a telemetry service, and/or any other suitable service. In some embodiments, respective container instances (e.g., VM instance 156) may use functionality provided by such services without installing individual software applications to implement the services. In some embodiments, users may utilize the functionality provided by these services by making web service API function calls through the frontend 120, which may be configured to receive requests from the user computer devices 102 and/or forward the requests to the appropriate service.

In some embodiments, the VM instance 156 and tasks 156A and 156B (e.g., implemented as sets of containers) being run by the VM instance 156 may each be connected to the network 104 (or to other networks) by instances of different VNIs. For example, as shown in FIG. 1, VM instance 156 may be connected to the network 104 by a VNI instance 140, task 156A may be connected to the network by a VNI instance 142, and task 156B may be connected to the network 104 by a VNI instance 144. Each of the VNI instances 140-144 may be associated with different security rules, such as rules permitting communications to and/or from various ports, to and/or from various IP addresses, to and/or from various subnets, etc. In some embodiments, container service system 110 may include a network interface virtualization coordinator ("NIVC") 170 that may provide virtualization services for network interfaces used by container instances and/or tasks being executed within container service system 110. In some embodiments, NIVC 170 may maintain, and implement various operations on, a set of interface records to manage networking operations required to access various resources of the container service system 110.

In some embodiments, the NIVC 170 may allow a user (e.g., a user of a user computing device 102) to request that a modifiable and transferable interface record and/or security rules that may be used to create a VNI instance be created, which may include various elements of networking configuration information (such as for example security policies, addressing and routing information) that the user wishes to set up and then associate and/or disassociate as desired with various container instances and/or tasks. An interface record may in some embodiments include one or more IP addresses and/or a subnet identifier for a subnet to which the IP address or addresses belong. Additionally or alternatively, an IP address and/or a subnet identifier may be generated at a time when a VNI instance is attached to a particular virtual machine instance for use by a particular container instance and/or task being executed by a particular container instance. In some embodiments, various security-related settings may be included in the interface records and/or security rules. For example, such security-related settings may include which entities or users are allowed to perform an "attach" and/or "detach" operation (i.e., the operations to add interfaces to instances or to remove interfaces from instances), allowed (and/or disallowed) communication protocols, allowed (and/or disallowed) sources and/or destinations (e.g., IP address, subnet identifier, etc.), allowed (and/or disallowed) ports, restrictions on incoming traffic based on security rules of a VNI being used to send the traffic, and/or any other suitable network rules. In some embodiments, the NIVC 170 may create a requested interface record and/or set of security rules and store it in an interface record database 132. In some embodiments, container service system 110 may be replicated across multiple logically distinct availability zones. In some such embodiments, each subnet associated with a user may be confined to a single availability zone, and a VNI record for launching a VNI instance associated with a task executed in these embodiments may be limited to subnets within the same availability zone as the container instance and/or task.

In some embodiments, the container service 110 (e.g., through frontend 120) may receive a request to "attach" an instance of a particular VNI to a particular virtual machine instance 156 to facilitate communications, with specified security rules and using an individual IP address (or multiple addresses), by container instance(s) executing a task 156A in the virtual machine instance. In this example, the NIVC 170 may identify the interface record (e.g., in the interface record database 132) that implements the specified security rules and/or is associated with the task 156A to be executed. From the identified interface record, the NIVC 170 may create, or cause another service or a process running on the server to create, a VNI interface 142. For example, the NIVC 170 may allocate physical or logical/virtual compute resources available to the computing environment 100 to storage of data related to the VNI interface 142, such as by creating one or more instance records in the interface record database 132, in the virtual machine instance 156, and/or in the associated container instances. The NIVC 170 may then attach the VNI instance 142 to the virtual machine instance 156, such as by identifying, in the created interface records, the virtual machine instance 156 that is authorized to use the VNI instance 142. Further, the NIVC 170 may include, in the created interface records, other information that configures the VNI instance 142, including without limitation information identifying: the network 104 that can be accessed; subnets to use; communication protocols to use; limitations on data transfer, such as a maximum data rate, time-of-day limitations, blacklisted and/or whitelisted destinations; communication ports that are open or closed; other firewall rules; and the like.

Additionally, to facilitate communications of the container instances that execute the task 156A, the NIVC 170 may include information in the instance records that identifies the task 156A and/or the container instances that are allocated to executing the task 156A (as described herein). This information may be used to "dedicate" the VNI instance 142 to the task 156A and/or its container instances: in some embodiments, each time a communication over the VNI instance 142 is attempted by a container instance on the virtual machine instance 156, the VNI instance 142 or a cooperating service, such as the communication service 190 or the event/request processing module 160 of the frontend 120, may determine, based on the instance records and/or the interface record (and possibly other data, such as container instance information from the instance resource status database 134), whether the container instance is executing the task 156A and is therefore authorized to use the VNI instance 142; in other embodiments, container instances allocated to executing the task 156A may include information, such as a task 156A identifier, that the container instance is configured to include with requests to use the VNI instance 142, and the VNI instance 142 may read such information from the container instance's request to determine whether to allow the requested communication (and may deny the attempt if the container instance does not present the required information); in still other embodiments, container instances for executing the task 156A may, during or after their creation, be assigned or connected to a virtual network stack (e.g., created or placed in a dedicated network namespace) to which the VNI instance 142 is also assigned or connected and to which other container instances (i.e., not for executing the task 156A) cannot connect. Although network traffic directed to and/or sent by a particular container instance or task may flow over one or more physical network interface cards ("NICs") that happen to be installed at a physical platform on which the container instance (e.g., VM instance 156) may currently be instantiated, the properties of the VNI attached to the container instance or task may be considered to be independent of any particular NIC or NICs or any other physical device on which the container instance is running.

In some embodiments, the container service 110 (e.g., through frontend 120) may receive a request to "detach" a VNI instance from a particular virtual machine instance to which it currently is attached. In some embodiments, the NIVC 170 may ensure that traffic directed to the IP address or addresses of the VNI instance to be detached no longer reaches the resource instance in some embodiments. For example, a process on the server using the VNI interface may receive a request to terminate the VNI interface, which can de-provision (i.e., return to a pool of available compute resources) the resources used by the VNI interface and stop sending/receiving traffic on the IP address of the VNI instance. In some embodiments, when a VNI instance is detached from a virtual machine instance, it may be destroyed (e.g., by removing instance records associated with the VNI instance from interface record database 132). Alternatively, in some embodiments, the VNI instance may remain attached to the virtual machine instance, and later reused by a different container instance or task that needs the same VNI instance configuration. This new attachment operation may then result in IP traffic targeted at the IP address(es) associated with the VNI instance reaching the newly associated container instance or task, using whichever set of physical NICs is appropriate, which may allow the user to easily transfer network configuration settings and associated security settings across resource instances without dealing with physical NICs directly. Various other operations such as modifications of IP addresses associated with a given VNI instance, modifications of security settings, billing-related operations and the like may be supported by the NIVC 170 in various embodiments.

As shown in FIG. 1, VM instance 156 is associated with three difference VNI instances 140-144. In some embodiments, VNI instances 140-144 may each be associated with different network security rules. In some embodiments, each of the VNIs 140-144 may be associated with a particular set of network security rules, which may differ from interface to interface. These network security rules may be used to filter traffic which enters and/or leaves the virtual machine instance 156 via the corresponding VNI instance. Note that, although the VNIs 140-144 are shown as providing communication with the network 104, this is merely an example, and a VNI may not provide access to an external network. Rather, a VNI may be configured to only allow communication within container service 110, a virtual network containing other container instances of the user, and/or entirely within the container instance(s) in which the task is being executed. In some embodiments, each VNI instance may be associated with at least one (primary) IP address, but may also be associated with multiple (secondary) IP addresses. In some embodiments, a virtual machine instance 156 may be limited (e.g., by a service provider of the container service system 110) to being associated with no more than a maximum number of VNI interfaces and/or secondary IP addresses. In some embodiments, when a virtual machine instance is created, the virtual machine instance may be created as a particular type of virtual machine instance that is associated with particular properties, where the properties may include a maximum number of VNI instances and/or a maximum number of secondary IP addresses (among other properties) that can be used by (e.g., attached to) the virtual machine instance. As such, launching a new VNI instance for attachment to a particular virtual machine instance may include the step of determining whether the virtual machine instance already has the maximum allowed number of VNI instances attached to it, as described further below.

In some embodiments, the container service system 110 may include a container provisioning service 180 that may determine, in response to a request to launch a task, which virtual machine instance (and/or subnet) to use to launch the task based on information associated with the request. In some embodiments, as described above, a user may request that a task be launched by submitting a request through frontend 120. In some embodiments, the request to launch the task may be associated with information indicating whether the task is to be associated with a dedicated VNI (e.g., rather than sharing a VNI with the container instance). In some embodiments, the information indicating whether the task is to be associated with a dedicated VNI may be received from any suitable source and in any suitable format. For example, the information may be included in a task definition associated with the task that is to be launched. In a more particular example, the information may be specified as a particular networking mode. In another more particular mode, the information may be specified by setting a flag in the task definition to true (or false).

Additionally, in some embodiments, the request to launch the task may be associated with information specifying an interface record and/or a set of security rules that should be used to create an associated VNI instance. In some embodiments, the information indicating whether the task is to be associated with a dedicated VNI may be received from any suitable source and/or in any suitable format. For example, the information may be included in the task definition associated with the task that is to be launched. As another example, the information may be passed as a parameter associated with the request. In some embodiments, the set of security rules may be stored in a location accessible by the container service system 110 (e.g., in container service database 130, in interface record database 132, etc.), and the information may identify the set of security rules to be used. Additionally or alternatively, the set of security rules may be included in whole or in part in the information associated with the request. In some embodiments, the request may be associated with multiple sets of security rules, which may all be associated with the VNI. Additionally or alternatively, the system may create one, some, or all of the security rules, and/or may select the security rules from a storage location, based on information contained in the task definition. For example, the task definition may specify devices and/or resources inside or outside of the virtual environment 100 to which containers associated with the corresponding task may connect; the system may read such information from the task definition and determine the appropriate ports to open, etc. In another embodiment, the system may derive the security rules in the same manner from the configuration(s) of containers/container instances associated with the corresponding task. A set of network security rules is sometimes referred to as a security group, and VNIs that are associated with the same set of network security rules are sometimes referred as being members of the same security group.

In some embodiments, the set of network security rules may include any suitable set of rules. For example, a set of network security rules may include a rule explicitly allowing inbound traffic formatted in accordance with the Transmission Control Protocol ("TCP") using port 22 from subnet 10.0.0.0/16, and a rule explicitly allowing outbound traffic formatted in accordance with the User Datagram Protocol ("UDP") using port 53 to subnet 4.4.4.4/32. As another example, a set of network rules may include setting the default to deny all outbound traffic, a rule to allow inbound traffic that originates from a VNI that is a member of the same security group, a rule explicitly allowing outbound TCP traffic using port 3306 directed to a subnet named SUBNET_B, and a rule explicitly allowing outbound TCP traffic using port 8080 directed to an address associated with a VNI instance that belongs to a security group named sg-webproxy.

In some embodiments, the request to launch the task may be associated with information specifying one or more subnets to which the VNI instance(s) may be attached. As described above, the user associated with the request may have access to one or more subnets which may be located in different availability zones, and in some embodiments, the task may only be launched in availability zones corresponding to the specified subnets.

In some embodiments, the container provisioning service 180 may determine which container instance or container instances that are available to the user (if any) have resources available to launch the task. The container provisioning service 180 may query the instance resource status database 134 for container instances that have the resources to run the task. If no container instances are available, the container provisioning service 180 may determine whether the associated virtual machine instance has resources available to be allocated to new container instances for executing the task, and may launch such new container instances in the available resources. With sufficient container instances allocated, the container provisioning service 180 may launch the task, or may cause the task to be launched, in the container instances, and further may coordinate with the NVIC service 170 to launch a dedicated VNI instance for the allocated container instances and attach the dedicated VNI instance to the virtual machine instance to enable communications by the container instances that necessary to execute the task.

In the environment illustrated in FIG. 1, the computing environment 100 includes the container service system 110, which includes the frontend 120, the container service database 130, the interface record database 132, the instance resource status database 134, the virtual machine instance 156, the network virtualization interface service 170, and the container provisioning service 180. The illustration of the various components within the container service system 110 is logical in nature and one or more of the components may be implemented by a single computing device or multiple computing devices. For example, the instances 156 and other instances may be implemented on one or more physical computing devices in different various geographic regions. Similarly, each of the frontend 120, the network virtualization interface service 170, and the container provisioning service 180 may be implemented across multiple physical computing devices. Alternatively, one or more of the frontend 120, the network virtualization interface service 170, and the container provisioning service 180 may be implemented on a single physical computing device. In some embodiments, the container service system 110 may comprise multiple electronic data stores, multiple frontends, multiple network virtualization interface services, and/or multiple container provisioning services. Although one virtual machine instance is shown in the example of FIG. 1, the embodiments described herein are not limited as such, and one skilled in the art will appreciate that the container service system 110 may comprise any number of virtual machine instances implemented using any number of physical computing devices. In some embodiments, the container service database 130, the interface record database 132, and the instance resource status database 134 may each be implemented in a separate electronic data store, or alternatively, multiple databases may be implemented within a common electronic data store. Although the container service database 130, the interface record database 132, and the instance resource status database 134 are shown as being part of the container service system 110, the databases and/or any other suitable electronic data store(s) may be implemented using any hardware and/or software, at any suitable location. For example, the container service database 130, the interface record database 132, and the instance resource status database 134 may be implemented as part of a device that communicates with the container service system 110 through network 104. Although only databases are illustrated in the example of FIG. 1, the computing environment 100 may include other levels of storage systems from which program code may be retrieved, and/or to which results may be saved. For example, each instance may have one or more storage systems either physically (e.g., a local storage resident on the physical computing system on which the instance is running) or logically (e.g., a network-attached storage system in network communication with the instance and provided within or outside of the container service system 110) associated with the instance on which the container is created. Alternatively, program code may be downloaded from a web-based data store.

In some embodiments, the container service system 110 may communicate information to the container agent 156C using a communication service 190. For example, the container service system 110 may send container images for container instances to be launched from the container service database 130 to the communication service 190. In such an example, the communication service 190 may relay the information to the container agent 156C, which may then use the container images to launch container instances in the VM instance 156. As another example, the container service system 110 may communicate information to be used to create a VNI instance from the interface record database 132 to the container agent 156C via the communication service 190. In some embodiments, just as container images are sent to the communication service 190, interface records for creating new VNI instances may also be sent.

In some embodiments, the container service system 110 may receive information from individual container agents 156C regularly, such as information related to life-cycle events and heartbeats (e.g., periodic signals sent by the container agents 156C to indicate normal operation). In some embodiments, this information may be communicated to the appropriate component or entity through the front-end service 120. In some embodiments, the container agents 156C communicate this information through the communication service 190, which may then communicate the information to the container service system 110 and/or, store the information in the databases 130-134 from which the container service system 110 and/or services associated with the container service system 110 may read the information.

In some embodiments, the communication service 190 may be configured to track the status of all agents in a cluster, and may push run commands and state transitions to respective instances. In some embodiments, communication by other components of the container service system 110, with container instances and the VM instances 156 may be performed through the communication service 190.

In the example of FIG. 1, the container service system 110 is illustrated as being connected to the network 104. In some embodiments, any of the components within the container service system 110 may communicate with other components (e.g., the user computing devices 102, and/or other services that may communicate with the container service system 110) of the computing environment 100 via the network 104. Additionally or alternatively, in some embodiments, not all components of the container service system 110 are capable of communicating with other components of the computing environment 100. In one example, only the frontend 120 may be connected to the network 104, and other components of the container service system 110 may communicate with other components of the computing environment 100 via the frontend 120. In another example, container instances and/or tasks within the container service system 110 with a VNI configured to communicate over network 104 may bypass the frontend 120.

Computing devices (e.g., user computing devices 102) may use the container service system 110 to execute one or more tasks thereon. For example, the user computing device 102 may be configured to request that one or more tasks (e.g., portions of an application and/or service) be executed by the container service system 110.

The frontend 120 receives and processes all the requests (sometimes in the form of event messages) to launch tasks on the container service system 110. In one embodiment, the frontend 120 serves as a front door to all the other services provided by the container service system 110. The frontend 120 processes the requests received from user computing devices 102 and/or generated, for example, in response to events, and makes sure that the requests are properly authorized. For example, the frontend 120 may determine whether the user computing device 102 associated with the request is authorized to run the task(s) specified in the request. In some embodiments, requests and/or events may be processed by an event/request processing module 160. For example, the event/request processing module 160 may process an event message for a request to launch one or more tasks, as described herein. In another embodiment, a separate polling service may be implemented, for example via a polling fleet configured to poll an event source or a message queue and perform at least an initial message conversion or processing to prepare the event message for further processing by the frontend 120 and/or another component of the container service system 110. In some embodiments, the event/request processing module 160 may periodically poll for event messages to be processed into requests to execute one or more functions. For example, the event/request processing module 160 may periodically access a message queue to determine and/or detect whether an event message has been placed in the message queue for processing by the container service system 110. In response to determining and/or detecting an event message in the message queue, the event/request processing module 160 may retrieve the message event from the message queue and initiate further processing of the event message. In some embodiments, the event/request processing module 160 may poll an event-triggering service directly rather than from a message queue. For example, some event-triggering services such as certain types of databases may support direct polling of event messages that need not necessarily rely on an intermediary message queue. In some embodiments, the event/request processing module 160 may manage the conversion of the event message (e.g., as accessed or retrieved from a message queue) into a request to execute one or more tasks. Additionally, in some embodiments, the event message may be generated in a format representative of a remote procedure call to facilitate rapid conversion and/or immediate function invocation by the container service system 110 when the event message is processed. Such embodiments may enable a high degree of functional transparency and reduced latency between an auxiliary system responding to an event trigger and the container service system 110 processing the event message generated by the auxiliary system responsive to the event trigger. While the event/request processing module 160 is shown as part of the frontend 120, in some embodiments, all or a portion of the event/request processing module 160 may be implemented by other components of the container service system 110 and/or another computing device. For example, in some embodiments, another computing device in communication with the container service system 110 may include several modules or components that operate similarly to the modules and components illustrated as part of the frontend 120. In some embodiments, the frontend 120 may further include other components than are shown in FIG. 1.

Software container images, software executed by container instances launched from software container images, and any other programs, as used herein, may refer to any program code (e.g., a program, routine, subroutine, thread, etc.) written in a specific program language. In the present disclosure, the terms "function," "code," "user code," and "program code," may be used interchangeably. For example, the software embodied in the software container images may be written in JavaScript (node.js), Java, Python, and/or Ruby. Software embodied in such software container images may be executed to achieve a specific task, for example, in connection with an event generated by the container instance (s) launched from the software container images. The request and/or corresponding event message may include an identifier to identify the task(s) to be executed, the code used to execute the function (or the location thereof), and one or more arguments to be used for executing the function. In another example, a request to launch a task may identify previously uploaded program code (e.g., using the API for uploading the code, with a task definition, etc.) by its name or its unique ID and one or more triggering conditions for executing the task.

The frontend 120 may receive the request to launch one or more tasks in response to HTTPS requests from a computing device or in response to triggering events. Also, any information (e.g., headers and parameters) included in the HTTPS request may also be processed and utilized when executing the user code. As discussed above, any other protocols, including, for example, HTTP, MQTT, and CoAP, may be used to transfer a message containing the request to execute one or more tasks to the frontend 120. In some embodiments, the frontend 120 may include a web service and/or may expose a web service HTTPS (or any other suitable protocol) API that may be used to submit requests to launch tasks, requests to decommission a task, and/or any other suitable request(s). The frontend 120 may also receive the request to launch one or more tasks when an event is detected, such as an event that the user (e.g., via the user computing device 102) has registered to trigger automatic request generation. For example, the user may have registered a timed job (e.g., execute functions every 24 hours). In such an example, when the scheduled time arrives for the timed job, the request to launch one or more tasks may be sent to the frontend 120. In another example, the frontend 120 may include or have access to a queue of incoming requests for launching one or more tasks, and when the request to launch or more tasks queued by the user computing device is removed from the work queue of the container service system 110, the frontend 120 may process the request. In yet another example, the request may originate from another component within the container service system 110 or other servers or services not illustrated in FIG. 1.

In some embodiments, the container service system 110 may include multiple frontends 120. In such embodiments, a load balancer may be provided to distribute the incoming requests and/or event messages to the multiple frontends 120, for example, in a round-robin fashion.

As shown in FIG. 1, container instances may have operating systems ("OS") and/or language runtimes loaded thereon. In some embodiments, the virtual machine instances may be used to serve any requests from any suitable computing device. In one embodiment, all the virtual machine instances of the container service system 110 are configured in the same or substantially similar manner. In another embodiment, the virtual machine instances of the container service system 110 may be configured differently to suit different needs. For example, the virtual machine instances may have different operating systems, different language runtimes, and/or different libraries loaded thereon. In yet another embodiment, the virtual machine instances of the container service system 110 may be configured in the same or substantially similar manner (e.g., with the same OS, language runtimes, and/or libraries), but some of those VM instances may have different container instance configurations. For example, two VM instances may have runtimes for both Python and Ruby, but one VM instance may have a container instance configured to run Python code, and the other VM instance may have a container instance configured to run Ruby code.

In some embodiments, a warming pool manager (not shown) may pre-configure virtual machine instances, such that each virtual machine instance is configured to satisfy at least one of the operating conditions that may be requested or specified by the request to launch one or more tasks on the container service system 110. In one embodiment, the operating conditions may include program languages in which the potential tasks may use. For example, such languages may include Java, JavaScript, Python, Ruby, and the like. In some embodiments, the set of languages that the tasks may use may be limited to a predetermined set (e.g., set of 4 languages, although in some embodiments sets of more or less than four languages are provided) in order to facilitate pre-initialization of the virtual machine instances that may satisfy requests to launch tasks. For example, operating conditions specified in the request may include: the amount of compute power to be used for processing the request; the type of the request (e.g., HTTP vs. a triggered event); the timeout for the request (e.g., threshold time after which the request may be terminated); security policies; etc.

In some embodiments, the container agent 156C may allow container instances to be managed, may provide state information, and may enable logging and telemetry data collection. For example, in some embodiments, the frontend 120 may communicate directly with the container agent 156C to launch tasks. In other embodiments, another service (e.g., container provisioning service 180, a scheduler service, etc.) may be used to communicate to the container agent 156C.

Although the virtual machine instances are generally described herein as being assigned to a particular user, in some embodiments, the instances may be assigned to a group of users, such that the instance is tied to the group of users and any member of the group may utilize resources on the instance. For example, the users in the same group may belong to the same security group (e.g., based on their security credentials) such that executing tasks from a first user in a container instance on a particular virtual machine instance after another task has been executed in another container instance on the same virtual machine instance does not pose security risks. Similarly, the container service 110 may assign the container instances according to one or more policies that dictate which requests may be executed in which container instances and which container instances may be assigned to which users. An example policy may specify that container instances are assigned to collections of users who share the same account (e.g., account for accessing the services provided by the container service system 110). In some embodiments, requests associated with the group of users may share the same container instances (e.g., if the tasks associated therewith are identical).

In some embodiments, the container service system 110 may maintain a separate cache in which software images, software containers, etc., are stored to serve as an intermediate level of caching system between the local cache of the virtual machine instances and a web-based network storage (e.g., accessible via the network 104).

After a particular tasks has been executed, the container service system 110 may tear down the container instances used to execute the task to free up the resources it occupied to be used for other container instances in the virtual machine instance. Alternatively, the container service system 110 may keep the container running to use it to service additional requests from the same user. For example, if another request associated with the same tasks that has already been loaded in the container has been received, the request may be assigned to the same container, thereby eliminating the delay associated with creating new container instances and loading the task in the container instances. In some embodiments, the container service system 110 may tear down the virtual machine instance in which the container instances used to execute the task were created. Alternatively, the container service system 110 may keep the instance running to use it to service additional requests from the same user. The determination of whether to keep the container and/or the instance running after the tasks is done executing may be based on a threshold time, the type of the user, average request volume of the user, and/or other operating conditions. For example, after a threshold time has passed (e.g., 5 minutes, 30 minutes, 1 hour, 24 hours, 30 days, etc.) without any activity (e.g., running of the code), the container and/or the virtual machine instance is shut down (e.g., deleted, terminated, etc.), and resources allocated thereto are released. In some embodiments, the threshold time passed before a container is torn down is shorter than the threshold time passed before an instance is torn down.

In some embodiments, the container service system 110 is adapted to begin execution of the task shortly after the request to launch the task is received (e.g., by the frontend 120).

Figure 2:
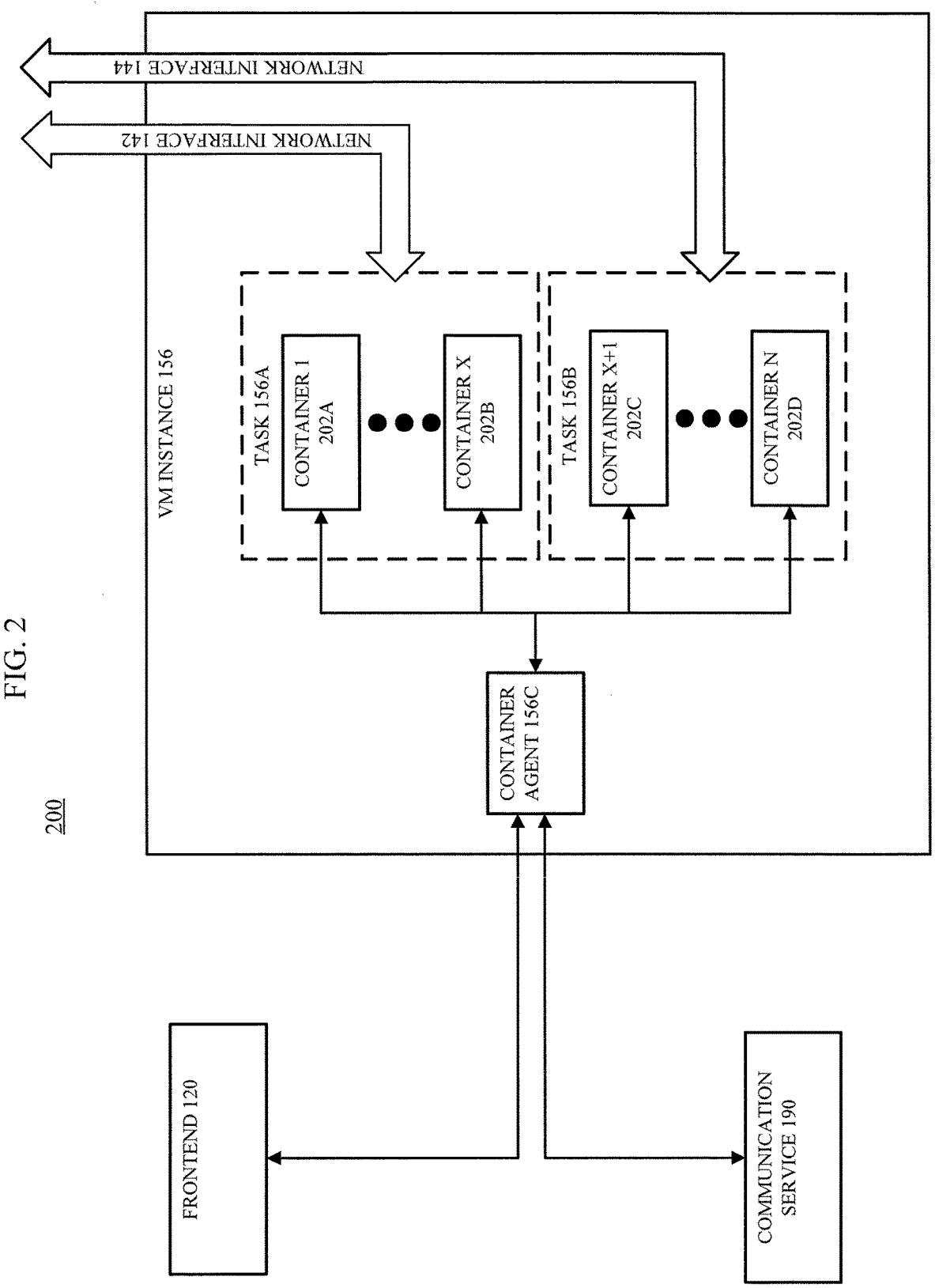
FIG. 2 is a diagram illustrating containers collectively executing a task using a VNI associated with the task.

FIG. 2 depicts an example showing individual container instances 202A-202D corresponding to tasks 156A and 156B. As shown in FIG. 2, container instances 202A to 202B that are part of task 156A may communicate using network interface 142, but cannot communicate using network interface 144, which is attached to task 156B.

Figure 3:
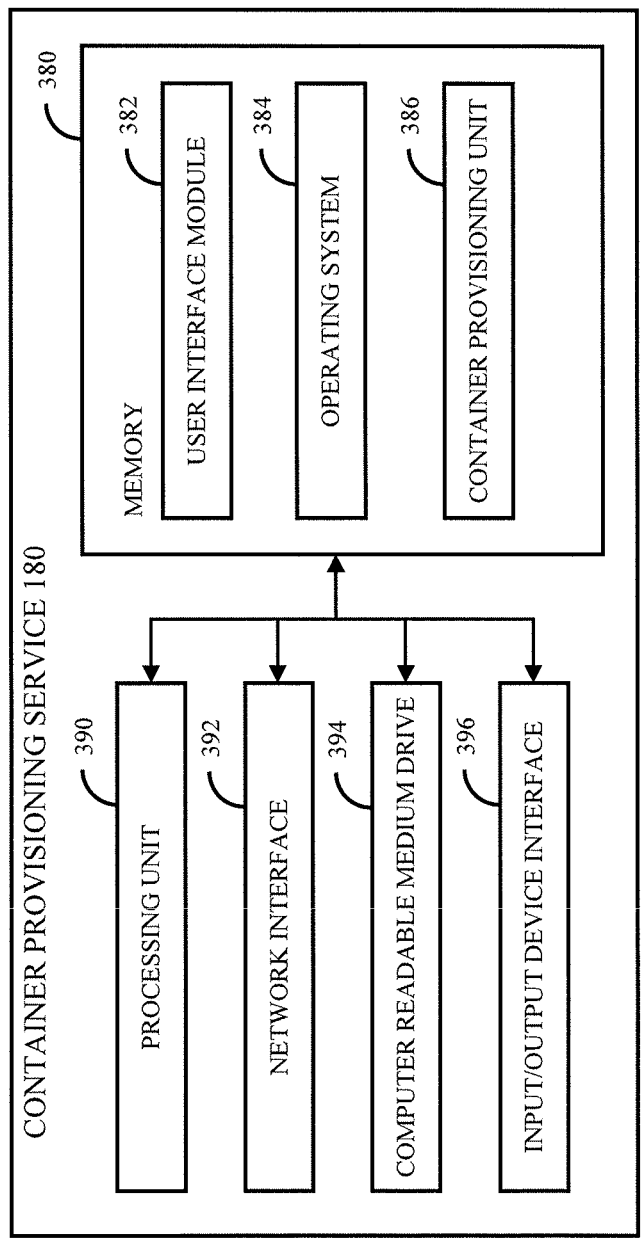
FIG. 3 is a block diagram of an exemplary computing device architecture providing a container provisioning system for determining which virtual machine instances have available resources to launch a requested task.

FIG. 3 depicts a general architecture of a computing system (referenced as container provisioning system 180) that identifies and/or selects instances in which a task that is requested to be launched may be successfully launched, initiates creation and/or attachment of VNIs, and/or causes the container service system 110 to launch the task. The general architecture of the container provisioning system depicted in FIG. 3 includes an arrangement of computer hardware and software modules that may be used to implement aspects of the present disclosure. The hardware modules may be implemented with physical electronic devices, as discussed in greater detail below. The container provisioning system 180 may include many more (or fewer) elements than those shown in FIG. 3. It is not necessary, however, that all of these generally conventional elements be shown in order to provide an enabling disclosure. Additionally, the general architecture illustrated in FIG. 3 may be used to implement one or more of the other components illustrated in FIG. 1. As illustrated, the container provisioning system 180 includes a processing unit 390, a network interface 392, a computer readable medium drive 394, and an input/output device interface 396, all of which may communicate with one another by way of a communication bus. The network interface 392 may provide connectivity to one or more networks or computing systems. The processing unit 390 may thus receive information and instructions from other computing systems or services via the network 104. The processing unit 390 may also communicate to and from memory 380 and further provide output information for an optional display (not shown) via the input/output device interface 396. The input/output device interface 396 may also accept input from an optional input device (not shown).

The memory 380 may contain computer program instructions (grouped as modules in some embodiments) that the processing unit 390 executes in order to implement one or more aspects of the present disclosure. The memory 380 generally includes RAM, ROM and/or other persistent, auxiliary or non-transitory computer-readable media. The memory 380 may store an operating system 384 that provides computer program instructions for use by the processing unit 390 in the general administration and operation of the container provisioning system 160. The memory 380 may further include computer program instructions and other information for implementing aspects of the present disclosure. For example, in one embodiment, the memory 380 includes a user interface module 382 that generates user interfaces (and/or instructions therefor) for display upon a computing device, e.g., via a navigation and/or browsing interface such as a browser or application installed on the computing device. In addition, the memory 380 may include and/or communicate with one or more data repositories (not shown), for example, to access user program codes and/or libraries.

In addition to, in combination with, and/or in lieu of the user interface module 382, the memory 380 may include a container provisioning unit 386 that may be executed by the processing unit 390. In one embodiment, the user interface module 382 and the network vulnerability scan coordination unit 386 individually or collectively implement various aspects of the present disclosure, e.g., determining which instance (if any) has available resources for launching a task to be associated with a VNI, selecting a particular instance in which to launch a requested task, etc.

Figure 4A:
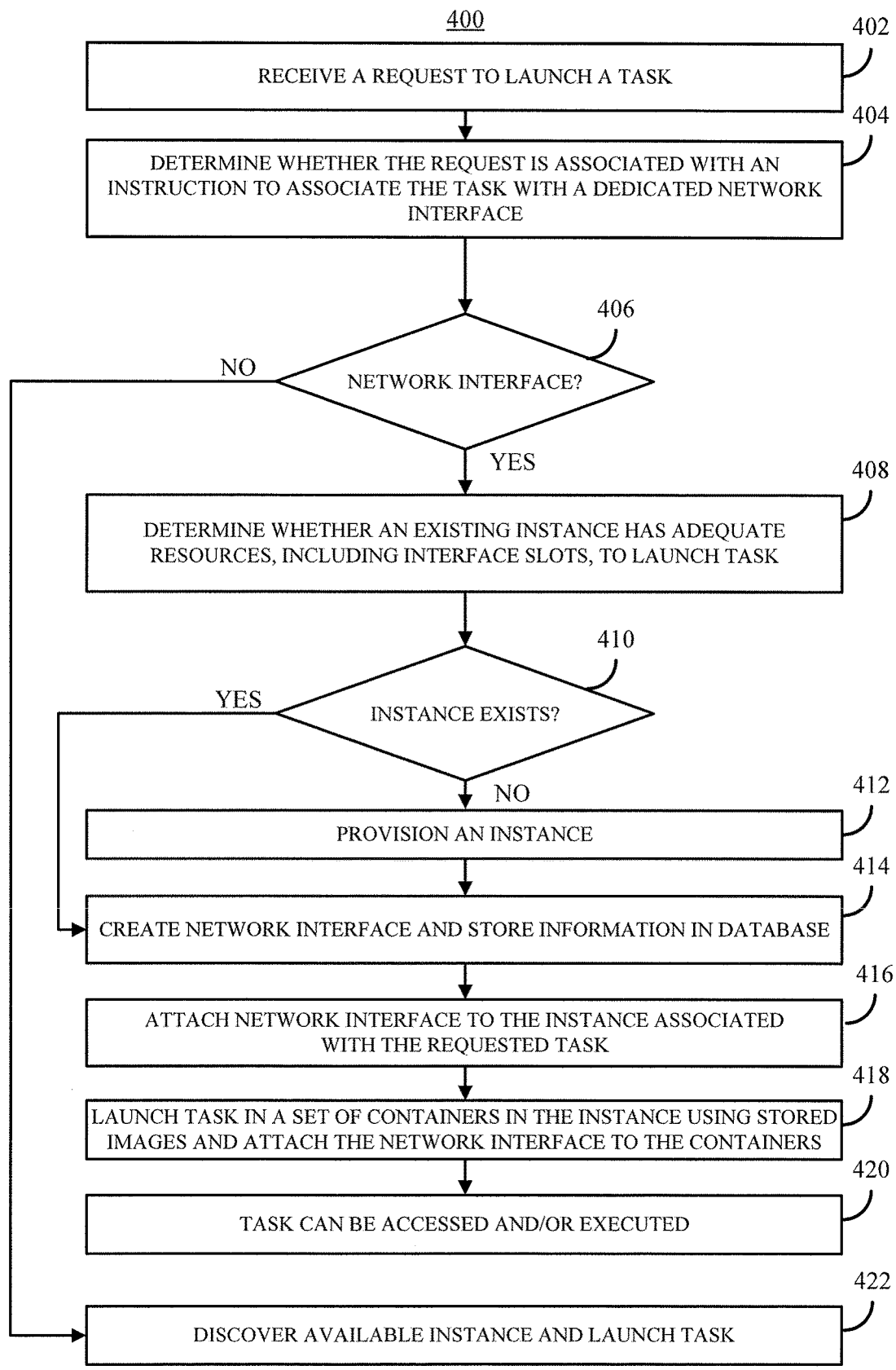
FIGS. 4A and 4B are flow diagrams of exemplary methods for provisioning a task with a dedicated VNI.

Turning now to FIG. 4A, a method 400 implemented by the components of the container service system 110 and/or VM instance 156, described above, launches containers of a task in an instance based on the resources required to execute the task in accordance with some embodiments of the disclosed subject matter. At 402, the system may receive a request to launch a task. As described above in connection with FIG. 1, in general, a request to launch a task may be associated with any suitable information indicating the identity of the task and/or information indicating whether the task is to be associated with a dedicated VNI. In an embodiment, the system can include a program that parses content of the task definition, extracts information relevant to the task from the task definition, and stores such information in a data store so that other programs that operate as part of the system can cause the network interfaces to be allocated to container instances. For example, the request may include identifying information of a task definition, and the task definition may indicate whether the task is to be associated with a dedicated VNI by including an identifier of a VNI, security rules, or network configuration data for the container instances specifying the ports and protocols to use. In some embodiments, if the task is to be associated with a dedicated VNI, the request to launch the task may also be associated with one or more sets of security rules to be used to create and/or attach the VNI.

At 404, the system may determine whether the request is associated with an instruction to associate the task with a dedicated network interface. For example, the system can include a worker program that reads the data store and discovers the request. The worker program can then determine that the task is associated with a dedicated network interface. For example, as described above, the system may determine whether the task definition specifies that the task is to be associated with a dedicated VNI. As another example, the system may determine whether a parameter of the request indicates that the task is to be associated with a dedicated VNI. In some embodiments, as described above in connection with FIG. 1, the request may be associated with one or more sets of security rules that are to be used to implement the dedicated VNI, if the dedicated VNI is to be associated with the task.

If the system determines that the request is not associated with an instruction to associate the task with a dedicated network interface ("NO" at 406), the system may move to 422 and discover an available container instance that has the compute resources (e.g., determined based on the task definition) to launch and/or execute the task, and may cause the task to be launched using that instance. For example, the worker program can send a command to a container instance instructing the container instance to run processes, programs, etc., corresponding to the task definition. In some embodiments, the selection of a particular container instance from among a group of resources with available resources may be made based on any suitable criteria, such as load balancing, cached program code, etc. Additionally, at 422, in some embodiments, the system may provide a response to the request indicating in which instance the task was launched.

Otherwise, if the system determines that the request is associated with an instruction to associate the task with a dedicated network interface ("YES" at 406), the system may move to 408.

At 408, the system may determine whether there are any existing virtual machine instances that have adequate resources to launch the task requested at 402. As described above, the system (e.g., via container provisioning system 180) may check the available resources of virtual machine instances to determine whether there is an appropriate virtual machine instance that has sufficient available container instances that can be configured to execute the task, and/or has available resources that can be allocated to launch new container instances for executing the task (and that is located in the same availability zone as a subnet in which the VNI is to be attached). Where the virtual machine instance is configured with a maximum number of VNI instances that can be attached to it at one time, the system may also determine whether the virtual machine instance has an available space to add the VNI instance (i.e., it does not have attached the maximum number of VNI instances). As described above in connection with FIG. 1, the system may access information in a database (e.g., the instance resource status database 134) to determine available resources of container instances. Note that the instance must also have the compute resources available to launch the task. In some embodiments, the system may provide a response to the request indicating that the task has not yet launched, and the task is currently being provisioned. In some embodiments, at least a portion of the method described in connection with FIG. 4A may be performed asynchronously with regard to the request, as provisioning an instance for launching a task when a dedicated VNI is to be associated with the task may take a relatively long time (e.g., on the order of seconds), the system may provide a response indicating the status of the request, rather than waiting until the task is launched (or fails to launch) to provide a response indicating that the response is ready. In such embodiments, the requesting device (e.g., user computing device 102) may be configured to periodically poll the system to determine whether the task has launched and/or where the task will be launched.

If the system determines that there is not at least one instance that has the resources to launch the task ("NO" at 410), the system may move to 412. At 412, the system may provision a new instance in which to launch the task and/or may generate an error indicating that no instance was available to launch the task. In some embodiments, the system may require user input (e.g., from a user associated with the request received at 402) before creating a new instance to launch the task.

Otherwise, if the system determines that there is at least one instance that has the resources to launch the task ("YES" at 410), the system may move to 414. At 414, the system may create the VNI. In one example embodiment, the worker process can send a request to a network virtualization interface service requesting that the service attach a network interface to the instance. In another example, the worker process can send a request to the network virtualization interface service to create a VNI based on the set(s) of security rules received in connection with the request at 402 and, in some embodiments, may store information regarding the VNI in the interface record database. In some embodiments, the system may determine whether an existing unused VNI may be used as the dedicated VNI. In some embodiments, if multiple instances have the available resources to launch the task, the system may select one of the instances using any suitable technique or combination of techniques, such as load balancing techniques. In some embodiments, the system may update a database of instance resources (e.g., instance resource database 134) to indicate that a new network interface is attached to the instance. Additionally, in some embodiments, the database may be updated before confirmation is received that the instance is attached to reduce the At 416, the system may attach the VNI to the instance associated with the requested task and/or to a subnet specified in the request. As described above in connection with FIG. 1, the system may attach the VNI to the instance associated with the requested task such that traffic may be targeted at an IP address associated with the VNI.

At 418, the system may launch the task in a set of container instances in the virtual machine instance to which the VNI instance has been attached. For example, the system may create, or cause the creation, of container instances based on the data of stored container images specified by the associated task definition, as described above in connection with FIG. 1. In some embodiments, the system may attach the VNI instance to the virtual machine instance and enable the container instances to use the VNI instance using any suitable technique or combination of techniques. For example, as described below in connection with FIG. 4B, the system may associate each container instance associated with the task with a network stack to which the VNI instance has been assigned.

At 420, the task may be ready to be accessed by one or more computing devices (e.g., user computing devices) and/or may begin executing. As described above, the system may not provide an indication to the user that requested that the task be launched, but may change a status of the task (e.g., from pending to running). In some embodiments, the status of the task may be made accessible to the user (e.g., through a query submitted to the frontend).

Figure 4B:
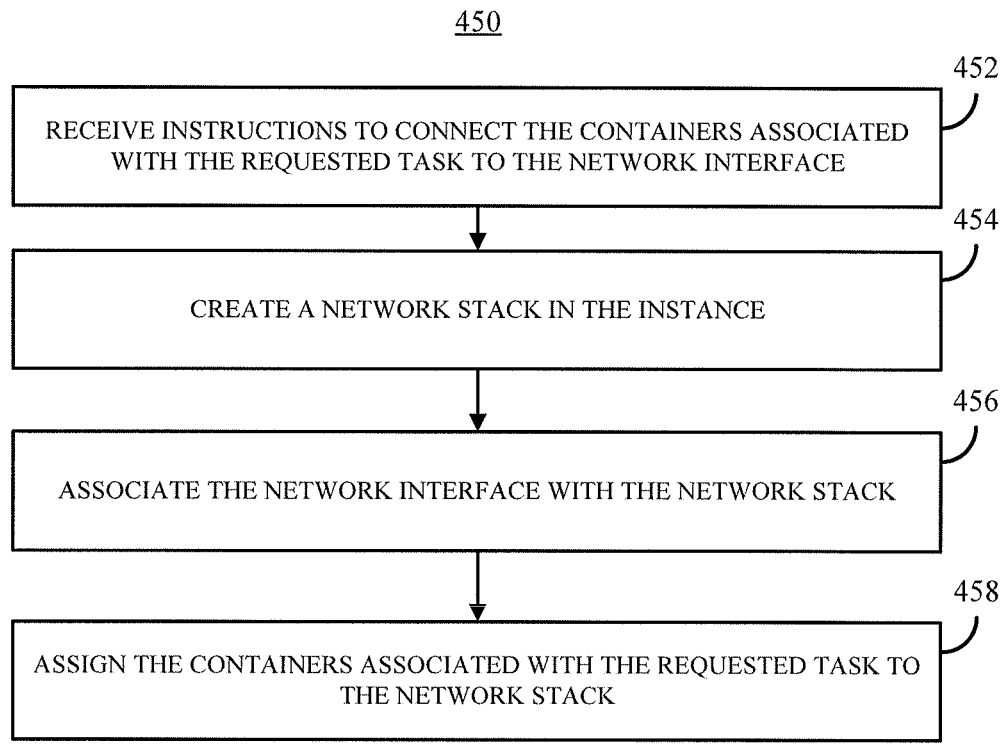

Turning to FIG. 4B, a method 450 implemented by the components of the VM instance 156, described above, enables the VNI instance to be used by container instances associated with the task in accordance with some embodiments of the disclosed subject matter. In an example embodiment, the method 450 may be performed to perform the actions of step 418 of FIG. 4A, described above. At 452, the system may receive instructions to connect the container instances associated with the task to the VNI instance. For example, the container agent 156C can receive instructions from front end 120 and/or communication service 190 to attach the container instances associated with the task to a VNI instance attached to the virtual machine instance.

At 454, the system may create, using any suitable technique or combination of techniques, one or more virtual network stacks for connecting the relevant container instances to the VNI instance. A network stack is a set of computer-executable instructions that enable one computing device or resource to communicate with another over the network(s) to which the devices/resources are attached, using one or more protocols that standardize communication through various layers of data transfer (e.g., physical layer, data link layer, network layer, transport layer, application layer). For example, an appropriate network stack to enable communication over the internet includes instructions to interpret the protocols of the internet protocol suite, such as TCP/IP. Similarly, a virtual network stack includes instructions that enable virtualized resources within a system to communicate with each other. An example virtual network stack is a network namespace in which virtual resources, such as container instances and VNI instances, may be placed. The network namespace may be configured so that the resources placed in the network namespace can use common local names without causing access collisions or other errors with respect to resources that are not in the network namespace. For example, the container agent 156C can instruct the operating system of the VM instance 156 to create a new network namespace (or other virtual network stack) or provision an existing network namespace to be used by the container instances associated with the task to access the VNI instance.

At 456, the system may associate the VNI interface with the new virtual network stack. For example, the container agent 156C may instruct the operating system of the VM instance 156 to associate the VNI instance with the same network stack with which the container instances are to be associated. As another example, the container agent 156C may instruct the operating system of the VM instance 156 to assign the VNI instance to the network namespace created or provisioned at 454.

At 458, the system may connect the container instances associated with the requested task to the virtual network stack created or provisioned at 454 (i.e., the virtual network stack to which the VNI instance is attached). In some embodiments, the container agent 156C may connect the container instances, or cause the container instances to be connected, to the virtual network stack as the container instances are launched. For example, the container agent 156C may instruct the operating system of the VM instance 156 to assign each container to the same virtual network stack as the VNI instance as each container is created. As another example, the container agent 156C may instruct the operating system of the VM instance 156 to assign the container instances to the network namespace created at 454 as the container instances are created. When the VNI instance and the container instances are connected by the virtual network stack, such as by being assigned to the same network namespace, the container instances can use the VNI interface in a dedicated fashion. For example, the container instances can send communications to physical network interface port numbers; these communications are received by the VNI interface, which can use network security rules specific to the network namespace to determine whether the communications over the requested port numbers are authorized.

In other embodiments, the steps of FIG. 4B may be performed in a different order. For example, the container agent 156C may, upon receiving the instructions at step 452, instruct the container provisioning service 180 to create new container instances within a new network namespace. The container agent 156C may receive confirmation that the container instances are created, along with an identifier for the new namespace. The container agent 156C may then use the identifier to issue commands, such as to the VM instance 156 or the NVIS 170, to move the VNI instance (created at step 414 of FIG. 4A) to the new namespace. In some embodiments, one container instance in the new namespace may or may not be associated with the task definition; this container instance may not execute part of the task, and may be associated with the task only to associate the VNI instance with the container instances associated with the task.

Figure 5:
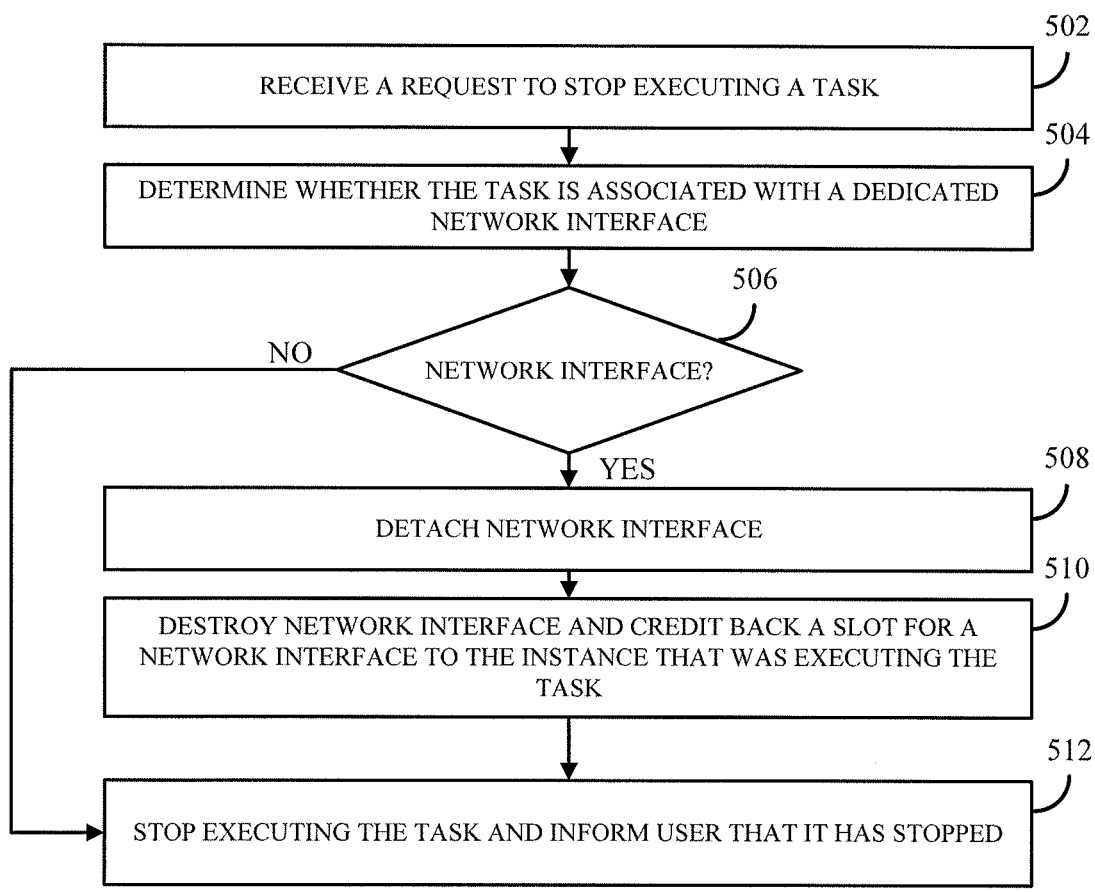
FIG. 5 is a flow diagram of an exemplary method for stopping a task and de-provisioning a VNI associated with the task.

As shown in FIG. 5, a method 500 implemented by the components of the container service system 110, described above, shuts down a task in accordance with some embodiments of the disclosed subject matter. At 502, the system may receive a request to stop executing a task from any suitable source. For example, the system may receive a request to stop executing the task from a user (e.g., via user computing device 102). As another example, the system may receive the request to stop executing the task in response to the task completing its execution.

At 504, the system may determine whether the task is associated with a dedicated VNI. In some embodiments, the system may use any suitable technique or combination of techniques to determine whether the task is associated with a VNI. For example, the system may check the interface record database 132 to determine whether a VNI is associated with the task. As another example, the system may check metadata associated with the container instance running the task and/or the task to determine whether the task is associated with a dedicated VNI.

If the task is not associated with a dedicated VNI ("NO" at 506), the system may move to 512, and may stop execution of the task (if it is still executing) and, in some embodiments, provide an indication to the user that the task has been stopped. Otherwise, if the task is associated with a dedicated VNI ("YES" at 506), the system may move to 508.

At 508, the system may inhibit further traffic from being forwarded using the VNI and may detach the VNI from the task and/or from the subnet to which it was attached.

At 510, the system may destroy or disable the VNI after it is detached from the task and may credit the slot for a VNI back to the instance that was executing the task. For example, the system may update the interface record database 132 to remove information about the VNI and/or may update the instance resource status database 134 to indicate that the instance is using one less VNI. The system may move to 512 to indicate that the task has been stopped.

Alternatively to disabling the VNI once the task to which the interface has been dedicated is stopped (or terminates on its own), the system may leave the VNI attached to the virtual machine instance. The system may update the instance resource status database 134 to indicate that the particular VNI is available for allocation to another task that is executing or later executed on the virtual machine instance. In some embodiments, the system may retain the VNI's configuration (e.g., security rules), and may assign the VNI to another task that requires the same parameters of network security. In other embodiments, the system may reconfigure the attached VNI for use with any task that needs a dedicated VNI.

Figure 6:
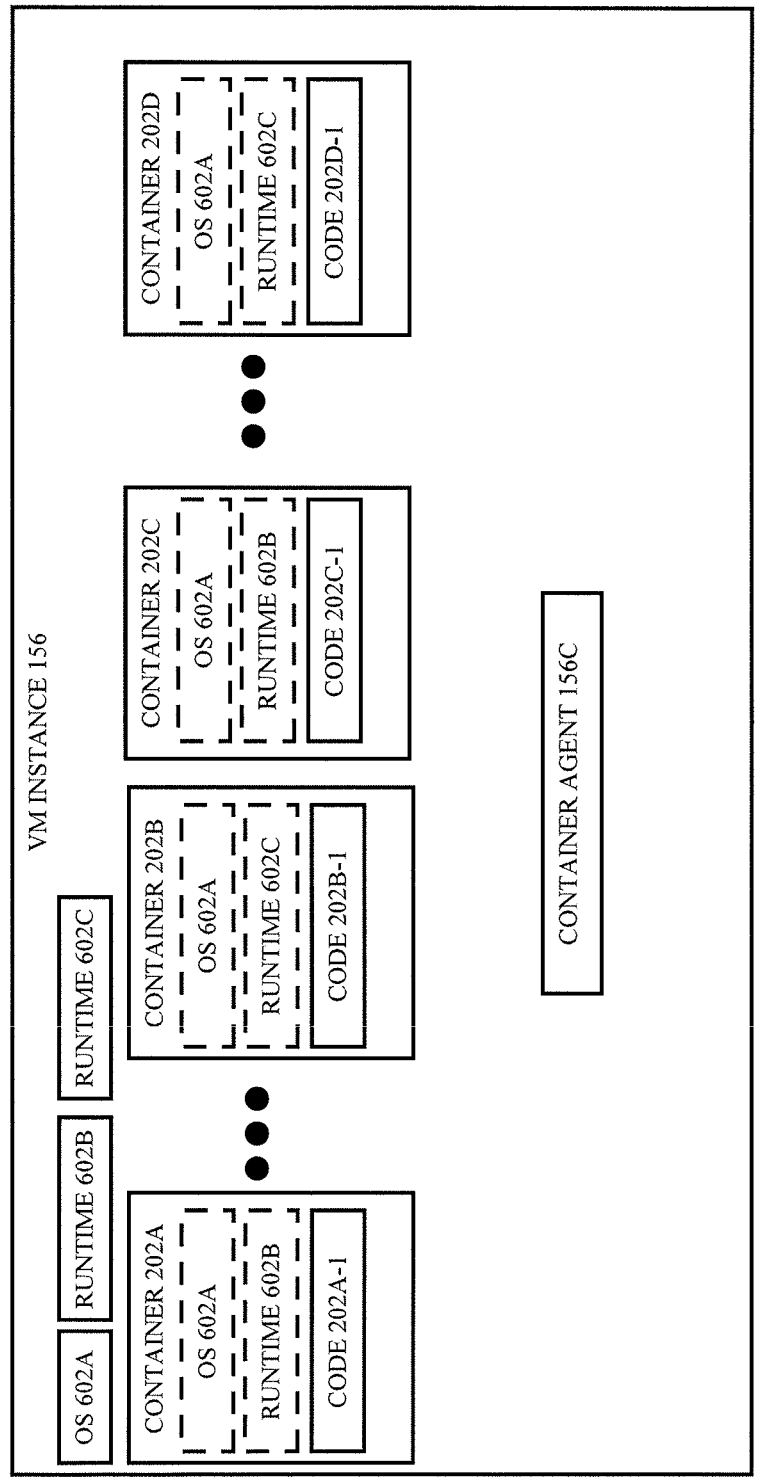
FIG. 6 is a diagram illustrating a general architecture of a virtual machine instance that may be used to execute one or more processes.

FIG. 6 depicts a general architecture of a virtual machine instance that may be used to execute one or more processes in accordance with some embodiments. As shown in FIG. 6, instances may have OSs, language runtimes, and container instances. The container instances may have individual copies of the OS and the runtimes and code loaded thereon. In the example of FIG. 6, the instance 156 has an OS 602A, runtimes 602B, 602C, and container instances 202A, 202B, 202C and 202D. The container instance 202A includes a copy of the OS 602A, a copy of the runtime 602B, and a copy of code 202A-1. The container 202B includes a copy of the OS 602A, a copy of the runtime 602C, and a copy of code 202B-1. The container instance 202C includes a copy of the OS 602A, a copy of the runtime 602B, and a copy of code 202C-1. The container instance 202D includes a copy of the OS 602A, a copy of the runtime 602C, and a copy of code 202D-1. In some embodiments, the container agent 156C may maintain configuration (e.g., OS, runtime, container, etc.) of the virtual machine instance and/or container instances being executed by the virtual machine instance. Note that in some embodiments, container instances may not have copies of the OS 602A or runtimes 602B or 602C stored by the instance 156, as the OS may be provided as part of the container image used to launch the container.

Figure 7:
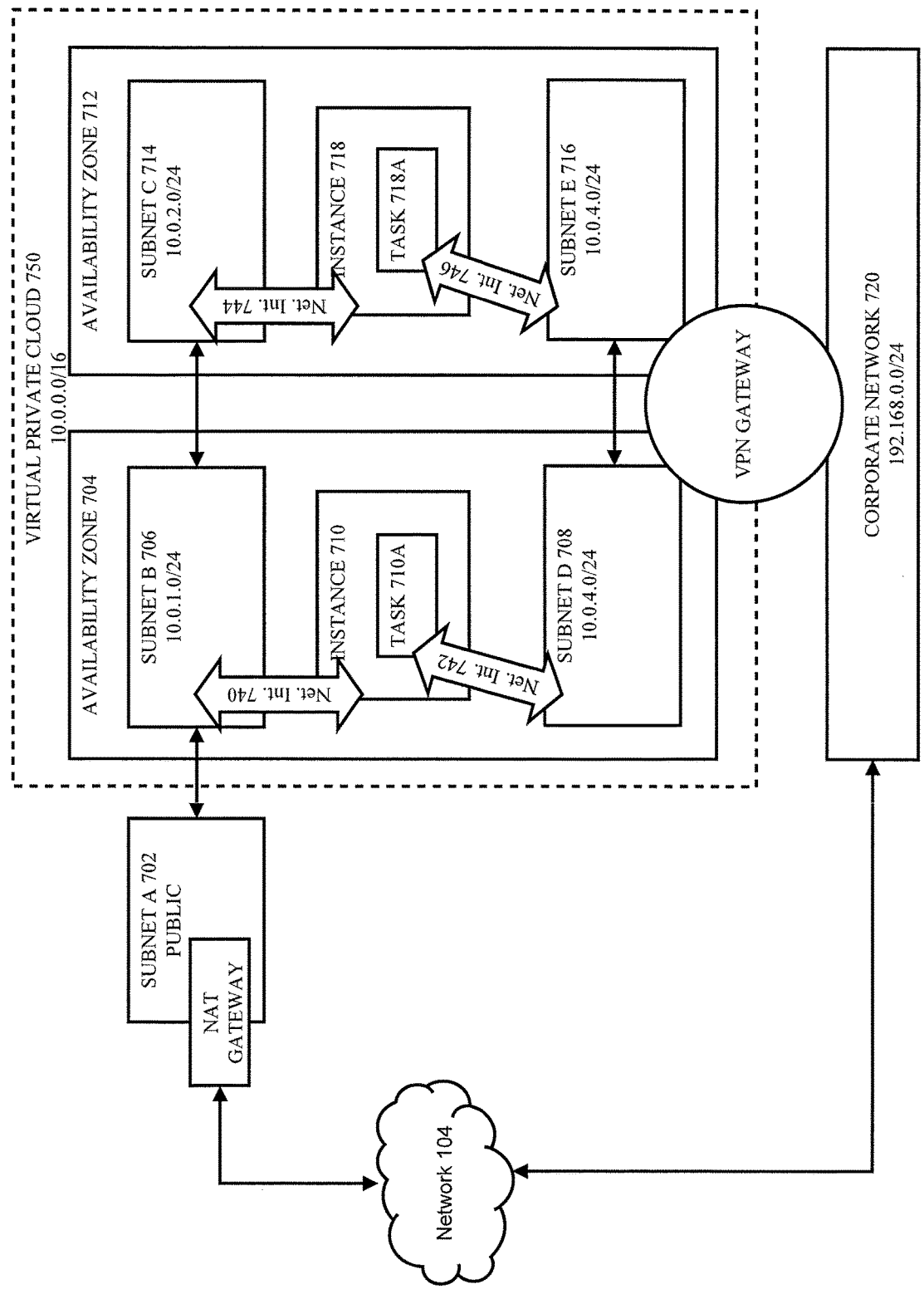
FIG. 7 is a diagram illustrating a general architecture of a compute resource virtualization platform in accordance with the present disclosure.

FIG. 7 depicts an example of a virtual private cloud ("VPC") system that may be configured in accordance with some embodiments of the present disclosure. As shown in FIG. 7, a VPC 750 associated with a user (e.g., an owner of corporate network 720) may have an IP address range (e.g., 10.0.0.0/16) and may be associated with various subnets, such as a subnet A 702 which may provide a connection between the VPC 750 and the network 104, which may be a public network, such as the Internet, via a network address translation (NAT) gateway. VPC 750 may include two availability zones, a first availability zone 704 and a second availability zone 712. As shown, availability zone 704 may include a first subnet 706 ("Subnet B") associated with a particular IP address range (e.g., 10.0.1.0/24) and a second subnet 708 ("Subnet D") associated with another IP address range (e.g., 10.0.4.0/24). Availability zone 712 may include similar subnets, such as a subnet 714 ("Subnet C") associated with a particular IP address range (e.g., 10.0.2.0/24) and a subnet 716 ("Subnet E") associated with another IP address range (e.g., 10.0.4.0/24). In some embodiments, subnet B and subnet C may share routing rules, for example a routing table, which may include multiple routes that may each specify a Classless Inter-Domain Routing (CIDR) destination(s) and a target (e.g., a particular gateway). For example, the routing table for subnet B and subnet C may include routing traffic directed to an IP address in the range 0.0.0.0/0 to the NAT gateway and routing traffic directed to an IP address in the range 10.0.0.0/16 internally within the VPC 750. As another example, subnet D and subnet E may share a routing table that includes routing traffic directed to an IP address in the range 10.0.0.0/16 internally within the VPC 750, and routing traffic directed to an IP address in the range 192.168.0.0/24 to the Virtual Private Network ("VPN") Gateway that is connected to the corporate network 720.

In some embodiments, a user associated with VPC 750 may request that a task (e.g., a task for maintaining availability zone fault tolerance requirements) be launched that has a VNI in subnet D with two sets of network security rules. The container service system 110 may receive the request and determine that an instance 710, which is associated with a VNI 740 in subnet B, located in a cluster associated with availability zone 704 has resources available to run the task. The container service system 110 may create and attach a VNI 742 to the instance 710 as a VNI associated with a task 710A that is launched responsive to the request. As described above, the request may be associated with multiple sets of network security rules, a first network security rule (e.g., "sg-secure-1") that includes a rule explicitly allowing inbound TCP formatted traffic using ports 0 through 65535 that originates from another VNI that is a member of the security group sg-secure-1, and a rule explicitly allowing outbound TCP formatted traffic using ports 0 through 65535 that is directed to another VNI that is a member of the security group sg-secure-1. The request may also be associated with a second network security rule (e.g., "sg-secure-2") that includes a rule explicitly allowing inbound TCP formatted traffic using port 8080 that originates from CIDR 192.168.0.0/24, and a rule explicitly allowing outbound TCP formatted traffic using port 8080 that is directed to originates from CIDR 192.168.0.0/24. These security rules may permit the task 710A to only send and receive data from other tasks or instances with VNIs belonging to security group sg-secure-1 (e.g., task 718A, as described below) and to communicate with a destination on the corporate network 720 via the VPN gateway.

In some embodiments, the user may also request that a similar task (task 718A) be launched with a virtual network connection 746 in subnet E with sets of network security rules sg-secure-1 and sg-secure-2, and the container service system 110 may determine that an instance 718 in availability zone 712 has the resources to execute the task. The container service system 110 may create and attach the VNI 746 to the instance 718 as a VNI associated with task 718A that is launched responsive to the request. Note that, because the request to launch the task 710A is to be associated with a virtual network connection 742 in subnet D, task 710A cannot be launched within availability zone 712. As shown in FIG. 7, tasks 710A and 718A may communicate with the corporate network 720, but cannot communicate with other destinations on network 104 outside the VPC 750 due to the restrictions imposed by the network security rules.

Thus, in accordance with the above description and the example depicted in the Figures, in one aspect the present disclosure provides a system including a first electronic data store configured to store a first record for a first virtual network interface (VNI) and a second record for a second VNI, and one or more hardware computing devices including specific computer-executable instructions. The first record for the first VNI includes a first set of network security rules that enable an instance of the first VNI to send or receive communications having one or more first permitted attributes; the second record for the second VNI includes a second set of network security rules that enable an instance of the second VNI to send or receive communications having one or more second permitted attributes, at least one of the one or more second permitted attributes being different from the first permitted attributes. The specific computer-executable instructions, upon execution by the one or more hardware computing devices, cause the system to: determine that a first container instance is allocated, for execution of a first task, in a first virtual machine instance; determine that the first task is associated with the first record; create, using the first record, a first VNI instance connecting the first virtual machine instance to a communication network and enabling the first container instance to send or receive, via the first VNI instance, communications to or from the communication network that have the one or more first permitted attributes; determine that a second container instance is allocated, for execution of a second task, in the first virtual machine instance; determine that the second task is associated with the second record; and create, using the second record, a second VNI instance connecting the first virtual machine instance to the communication network and enabling the second container instance to send or receive, via the second VNI instance, communications to or from the communication network that have the one or more second permitted attributes, the first container instance being unable to use the second VNI instance, and the second container instance being unable to use the first VNI instance.

The one or more hardware computing devices may be further configured to execute specific computer-executable instructions that upon execution cause the system to: receive additional instructions to launch a third container instance in the first virtual machine instance, the third container instance requiring a third VNI instance to be connected to the first virtual machine instance; determine that the first virtual machine instance is connected to a maximum number of dedicated VNI instances; determine that a second virtual machine instance is connected to less than the maximum number of dedicated VNI instances; launch the third container instance within the second virtual machine instance; and create the third VNI instance connecting the second virtual machine instance to the communication network and enabling the third container instance to send or receive communications to or from the communication network, the third container instance being unable to use the first VNI instance and the second VNI instance. The communication network may be a virtual network comprising a plurality of subnets at least partially isolated from each other, and the one or more hardware computing devices may be further configured to execute specific computer-executable instructions that upon execution cause the system to: determine that the first task is capable of being executed within either of a first subnet and a second subnet of the plurality of subnets; determine that no virtual machine instances associated with the first subnet are able to execute the first task; and, determine that the first virtual machine instance is associated with the second subnet and is able to execute the first task using the first container instance.

The first record may configure the first VNI instance to deliver to the first container instance incoming communications that are directed to a first communication port, and to deny delivery to the first container instance incoming communications that are directed to a second communication port; the second record may configure the second VNI instance to deliver to the second container instance incoming communications that are directed to the second communication port. The one or more hardware computing devices may be further configured to execute specific computer-executable instructions that upon execution cause the network scanning system to, subsequent to creating the first VNI interface: receive a request to stop execution of the first container instance; and, responsive to the request, remove the first container instance from the first virtual machine instance and disable the first VNI interface.

In another aspect, the present disclosure provides a system that includes one or more hardware computing devices configured to execute specific computer-executable instructions that upon execution cause the system to: receive a request to run a first container instance, the first container instance associated with a virtual network interface (VNI) record and a first container image; cause a first VNI instance based on the VNI record to be attached to a first virtual machine instance, the first VNI instance connecting the first virtual machine instance to a first computer network and having a first security configuration that is used to allow or deny communications sent to or from the first virtual machine instance according to one or more security rules; and, send a request to an agent in the first virtual machine instance to connect the first container instance to the first VNI instance. The request to run the first container instance may be part of a request to execute a software application accessible by an end user device connected to the first computer network, the software application being executed by a plurality of software container instances including the first container instance; the request to the agent may cause the creation of a virtual network stack connecting the plurality of software container instances to the first VNI instance, wherein the virtual network stack does not connect container instances not included in the plurality of software container instances to the first VNI instance.

The one or more hardware computing devices may be further configured to execute specific computer-executable instructions that upon execution cause the one or more hardware computing devices to: receive a task definition describing a task to be executed by task-specific container instances launched from one or more container images including the first container image; determine, based on the task definition, the one or more security rules; and, create the VNI record including the one or more security rules. The one or more hardware computing devices may be further configured to execute specific computer-executable instructions that upon execution cause the one or more hardware computing devices to: receive a task definition describing a task to be executed by task-specific container instances launched from one or more container images including the first container image; determine, based on the task definition, one or more routing rules; and, create the VNI record including the one or more routing rules, the first security configuration of the first VNI instance further being used to route the communications sent to or from the first virtual machine instance to one or more destinations according to the one or more routing rules.

A second VNI instance may be attached to the first virtual machine instance, the second VNI instance having a second security configuration that enables communication of the first virtual machine instance over the first computer network using a specified port and a specified IP address; the first container instance may be unable to use the second VNI instance. The first virtual machine instance may include a second container instance that is not able to use any of a plurality of dedicated VNI instances connecting the first virtual machine instance to the first computer network, the plurality of dedicated VNI instances including the first VNI instance and not including the second VNI instance, and the second security configuration may enable the second container instance to communicate over the first computer network using the second VNI instance. The one or more hardware computing devices may be further configured to execute specific computer-executable instructions that upon execution cause the one or more hardware computing devices to determine that the first virtual machine instance is configured to operate within a first subnet of a plurality of subnets of a virtual computer network, and cause the first VNI instance to be configured to operate within the first subnet.

In yet another aspect, the present disclosure provides a method that includes the steps of: receiving a request to run a first container instance, the first container instance associated with a virtual network interface (VNI) record and a first container image; causing a first VNI instance based on the VNI record to be attached to a first virtual machine instance, the first VNI instance connecting the first virtual machine instance to a first computer network and having a first security configuration that is used to allow or deny communications sent to or from the first virtual machine instance according to one or more security rules; and, sending a request to an agent in the first virtual machine instance to connect the first container instance to the first VNI instance. The method may further include receiving a task definition describing execution of a software application and causing, based on the task definition, a first set of container instances including the first container instance to be launched on the first virtual machine instance from one or more software container images including the first container image; the request to the agent may cause the first set of container instances to be connected to the first VNI instance, and the one or more security rules may identify one or more of a plurality of ports of the first VNI instance as authorized ports, the first security configuration further being used to allow communication by the first set of software containers using the one or more authorized ports of the first VNI instance and to deny communication by the first set of software containers using one of the plurality of ports that is not one of the one or more authorized ports.

The method may further include the steps of: causing the first container instance to be launched, from the first container image, on the first virtual machine instance within a first network namespace associated with the first container instance; and, receiving an identifier of the first network namespace. The request to the agent to connect the first container instance to the first VNI instance may include the identifier and an instruction that the agent assign, using the identifier, the first VNI instance into the first network namespace. The method may further include the steps of: receiving a task definition describing a task to be executed by task-specific container instances launched from one or more container images including the first container image; determining, based on the task definition, the one or more security rules; and, creating the VNI record including the one or more security rules. The method may further include the steps of: receiving a task definition describing a task to be executed by task-specific container instances launched from one or more container images including the first container image; determining, based on the task definition, one or more routing rules; and, creating the VNI record including the one or more routing rules, the first security configuration of the first VNI instance further being used to route the communications sent to or from the first virtual machine instance to one or more destinations according to the one or more routing rules.

The first virtual machine instance may be associated with a third VNI instance implemented in accordance with a third security configuration that enables communication over the first computer network using a specified port and a specified IP address, wherein the first container instance and the second container instance are inhibited from communicating using the third VNI instance. The first virtual machine instance may execute a third set of running software containers that is different than the first set of running software containers, wherein the third set of running software containers is permitted to communicate using the third VNI instance and is inhibited from using the first VNI instance. The method may further include the steps of receiving identifying information of a subnet to which the first VNI instance is to be attached, and determining that the first virtual machine instance is located in an availability zone in which the first subnet is located.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

It should be understood that the above described steps of the processes of FIGS. 4A, 4B and 5 can be executed or performed in any order or sequence not limited to the order and sequence shown and described in the figures. Also, some of the above steps of the processes of FIGS. 4A, 4B and 5 can be executed or performed substantially simultaneously where appropriate or in parallel to reduce latency and processing times.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A system for controlling execution of a plurality of tasks that each implement at least a portion of a software application accessible by an end user device, wherein the tasks are executed by a first virtual machine instance of a plurality of virtual machine instances, the system comprising:
  a first electronic data store configured to store a first record for a first virtual network interface (VNI) and a second record for a second VNI, wherein:
    the first record for the first VNI includes a first set of network security rules that are determined based on a first task definition received by the system, the first task definition describing one or more first permitted attributes of communications associated with a first task, and the first set of network security rules allow an instance of the first VNI to perform operations to send or receive communications having the one or more first permitted attributes, wherein the first task implements at least a portion of the software application; and
    the second record for the second VNI includes a second set of network security rules that are determined based on a second task definition received by the system, the second task definition describing one or more second permitted attributes of communications associated with a second task, and the second set of network security rules allow an instance of the second VNI to perform operations to send or receive communications having the one or more second permitted attributes, at least one of the one or more second permitted attributes being different from the first permitted attributes; and
  one or more hardware computing devices including specific computer-executable instructions that upon execution cause the system to:
    create, using the first record, a particular instance of the first VNI that connects the first virtual machine instance to a communication network and enables a first container instance to send to the communication network or receive from the communication network, via the particular instance of the first VNI, only communications that have the one or more first permitted attributes, wherein the first container instance is allocated in the first virtual machine to execute the first task;
    create, using the second record, a particular instance of the second VNI that connects the first virtual machine instance to the communication network and enables a second container instance to send to the communication network or receive from the communication network, via the particular instance of the second VNI, only communications that have the one or more second permitted attributes, the first container instance being unable to use the particular instance of the second VNI, and the second container instance being unable to use the instance of the first VNI, wherein the second container instance is allocated in the first virtual machine to execute the second task.

2. The system of claim 1, wherein the one or more hardware computing devices are further configured to execute specific computer-executable instructions that upon execution cause the system to:
  receive additional instructions to launch a third container instance in the first virtual machine instance, the third container instance requiring a new instance of a third VNI to be connected to the first virtual machine instance;
  determine that the first virtual machine instance is connected to a maximum number of dedicated VNI instances;
  determine that a second virtual machine instance is connected to less than the maximum number of dedicated VNI instances;
  launch the third container instance within the second virtual machine instance; and
  create a particular instance of the third VNI that connects the second virtual machine instance to the communication network and enables the third container instance to send or receive communications to or from the communication network, the third container instance being unable to use the particular instance of the first VNI and the particular instance of the second VNI.

3. The system of claim 1, wherein the communication network is a virtual network comprising a plurality of subnets at least partially isolated from each other, and the one or more hardware computing devices are further configured to execute specific computer-executable instructions that upon execution cause the system to:
  determine that the first task is capable of being executed within either of a first subnet and a second subnet of the plurality of subnets;
  determine that no virtual machine instances associated with the first subnet are able to execute the first task; and
  determine that the first virtual machine instance is associated with the second subnet and is able to execute the first task using the first container instance.

4. The system of claim 1, wherein:
  the first record configures the particular instance of the first VNI to deliver to the first container instance incoming communications that are directed to a first communication port, and to deny delivery to the first container instance incoming communications that are directed to a second communication port; and
  the second record configures the particular instance of the second VNI to deliver to the second container instance incoming communications that are directed to the second communication port.

5. The system of claim 1, wherein the one or more hardware computing devices are further configured to execute specific computer-executable instructions that upon execution cause the system to, subsequent to creating the first VNI interface:
  receive a request to stop execution of the first container instance; and
  responsive to the request:
    remove the first container instance from the first virtual machine instance; and
    disable the particular instance of the first VNI.

6. A system for controlling execution of tasks that implement at least a portion of a software application accessible by an end user device, wherein the tasks are executed by a particular virtual machine instance of a plurality of virtual machine instances, the system comprising one or more hardware computing devices configured to execute specific computer-executable instructions that upon execution cause the system to:

receive a task definition describing a task to be executed by container instances which are to be launched from one or more container images including a first container image, and which are to be allocated within one or more virtual machine instances;

determine, based on the task definition, one or more security rules associated with the task;

create a first virtual network interface (VNI) record including the one or more security rules;

store the first VNI record in an electronic data store, wherein the first VNI record includes one or more first parameters related to allowed operations by a VNI instance that is to be connected with one or more of the container instances which are to be allocated to execute the task, the electronic data store storing at least a second VNI record for a VNI instance having one or more second parameters;

receive a request to run a first container instance allocated within a first virtual machine instance of the plurality of virtual machine instances, the first container instance associated with the first VNI record and launched from the first container image;

cause a first VNI instance based on the fir VNI record to be attached to the first virtual machine instance, the first VNI instance connecting the first virtual machine instance to a first computer network and allowing or denying communications sent to or from the first virtual machine instance over the first computer network based on the one or more security rules including the one or more parameters related to allowed operations; and send a request to an agent in the first virtual machine instance to connect the first container instance to the first VNI instance thereby enabling the first container instance to perform the one or more allowed operations to send or receive communications associated with the task to or from the first computer network via the first VNI instance, the first container instance being unable to use a second VNI instance based on the second VNI record.

7. The system of claim 6, wherein the request to run the first container instance is part of a request to execute a software application accessible by an end user device connected to the first computer network, at least a portion of the software application being executed by each of a plurality of software container instances including the first container instance, and wherein the request to the agent causes the creation of a virtual network stack connecting the plurality of software container instances to the first VNI instance, wherein the virtual network stack does not connect container instances not included in the plurality of software container instances to the first VNI instance.

8. The system of claim 6, wherein the one or more hardware computing devices are further configured to execute specific computer-executable instructions that upon execution cause the one or more hardware computing devices to:

determine, based on the task definition, one or more routing rules; and create the first VNI record including the one or more routing rules, the first security configuration of the first VNI instance further being used to route the communications sent to or from the first virtual machine instance to one or more destinations according to the one or more routing rules.

9. The system of claim 6, wherein the second VNI instance is attached to the first virtual machine instance, the second VNI instance having a second security configuration that enables communication of the first virtual machine instance over the first computer network using a specified port and a specified IP address.

10. The system of claim 9, wherein the first virtual machine instance comprises a second container instance that is not able to use any of a plurality of dedicated VNI instances connecting the first virtual machine instance to the first computer network, the plurality of dedicated VNI instances including the first VNI instance and not including the second VNI instance, and the second security configuration enables the second container instance to communicate over the first computer network using the second VNI instance.

11. The system of claim 6, wherein the one or more hardware computing devices are further configured to execute specific computer-executable instructions that upon execution cause the one or more hardware computing devices to:

determine that the first virtual machine instance is configured to operate within a first subnet of a plurality of subnets of a virtual computer network; and cause the first VNI instance to be configured to operate within the first subnet.

12. A method for controlling execution of tasks that implement at least a portion of a software application accessible by an end user device, wherein the tasks are executed by a particular virtual machine instance of a plurality of virtual machine instances, the method comprising:

receiving a task definition describing a task to be executed by container instances which are to be launched from one or more container images including a first container image, and which are to be allocated within one or more virtual machine instances;

determining, based on the task definition, one or more security rules associated with the task;

creating a first virtual network interface (VNI) record including the one or more security rules;

store the first VNI record in an electronic data store, wherein the first VNI record includes one or more first parameters related to allowed operations by a VNI instance that is to be connected with one or more of the container instances which are to be allocated to execute the task, the electronic data store storing at least a second VNI record for a VNI instance having one or more second parameters;

receiving a request to run a first container instance allocated within a first virtual machine instance of the plurality of virtual machine instances, the first container instance associated with the first VNI record and the first container image;

causing a first VNI instance based on the first VNI record to be attached to the first virtual machine instance, the first VNI instance connecting the first virtual machine instance to a first computer network and allowing or denying communications sent to or from the first virtual machine instance over the first computer network based one or more security rules the one or more parameters related to allowed operations; and sending a request to an agent in the first virtual machine instance to connect the first container instance to the first VNI instance thereby enabling the first container instance to perform the one or more allowed operations to send or receive communications associated with the task to or from the first computer network via the first VNI instance, the first container instance being unable to use a second VNI instance based on the second VNI record.

13. The method of claim 12, wherein the task definition describing execution of at least a portion of a software application, the method further comprising:

causing, based on the task definition, a first set of container instances including the first container instance to be launched on the first virtual machine instance from one or more software container images including the first container image;

wherein the request to the agent causes the first set of container instances to be connected to the first VNI instance; and wherein the one or more security rules identify one or more of a plurality of ports of the first VNI instance as authorized ports, the first security configuration further being used to allow communication by the first container instance using the one or more authorized ports of the first VNI instance and to deny communication by the first container instance using one of the plurality of ports that is not one of the one or more authorized ports.

14. The method of claim 12, further comprising:

causing the first container instance to be launched, from the first container image, on the first virtual machine instance within a first network namespace associated with the first container instance; and receiving an identifier of the first network namespace;

wherein the request to the agent to connect the first container instance to the first VNI instance includes the identifier and an instruction that the agent assign, using the identifier, the first VNI instance into the first network namespace.

15. The method of claim 12, further comprising:

determining, based on the task definition, one or more routing rules; and creating the first VNI record including the one or more routing rules, the first security configuration of the first VNI instance further being used to route the communications sent to or from the first virtual machine instance to one or more destinations according to the one or more routing rules.

16. The method of claim 12, wherein the first virtual machine instance is associated with the second VNI instance implemented in accordance with a second security configuration that enables communication over the first computer network using a specified port and a specified IP address.

17. The method of claim 16, wherein the first virtual machine instance executes a third container instance that is different than the first container instance and a second container instance, wherein the third container instance is permitted to communicate using the second VNI instance and is inhibited from using the first VNI instance.

18. The method of claim 12, further comprising:

receiving, prior to causing the first VNI instance to be attached to a first virtual machine instance, identifying information of a subnet to which the first VNI instance is to be attached; and determining that the first virtual machine instance is associated with an availability zone in which the subnet is located.

* * * * *